(12) United States Patent
Palella et al.

(10) Patent No.: US 10,234,292 B2
(45) Date of Patent: Mar. 19, 2019

(54) POSITIONING APPARATUS AND GLOBAL NAVIGATION SATELLITE SYSTEM, METHOD OF DETECTING SATELLITE SIGNALS

(71) Applicant: STMicroelectronics S.r.l., Agrate Brianza (IT)

(72) Inventors: Nicola Matteo Palella, Rivolta d' adda (IT); Leonardo Colombo, Lecco (IT)

(73) Assignee: STMICROELEFCTRONICS S.R.L., Agrate Brianza (IT)

( * ) Notice: Subject to any disclaimer, the term of this patent is extended or adjusted under 35 U.S.C. 154(b) by 681 days.

(21) Appl. No.: 14/675,020

(22) Filed: Mar. 31, 2015

(65) Prior Publication Data

US 2016/0040992 A1    Feb. 11, 2016

(30) Foreign Application Priority Data

Aug. 8, 2014   (IT) .............................. MI2014A1479

(51) Int. Cl.
*G01C 5/06* (2006.01)
*G01C 21/16* (2006.01)
(Continued)

(52) U.S. Cl.
CPC ......... *G01C 21/165* (2013.01); *B60W 40/107* (2013.01); *G01C 5/06* (2013.01);
(Continued)

(58) Field of Classification Search
None
See application file for complete search history.

(56) References Cited

U.S. PATENT DOCUMENTS 6,456,906 B1 * 9/2002 Hua ....................... G05D 1/107
                                                         102/501
6,553,225 B1 * 4/2003 Zhao .................... H04B 7/2041
                                                         370/348
(Continued)

FOREIGN PATENT DOCUMENTS

EP         2 249 172 A1     11/2010

OTHER PUBLICATIONS

Gait Analysis Using Wearable Sensors Weijun Tao,1 Tao Liu,2, Rencheng Zheng,3 and Hutian Feng1, Published online Feb. 16, 2012 https://www.ncbi.nlm.nih.gov/pmc/articles/PMC3304165/ Downloaded Aug. 6, 2018.*

(Continued)

*Primary Examiner* — Michael Lebentritt
(74) *Attorney, Agent, or Firm* — Seed IP Law Group LLP

(57) ABSTRACT

A positioning apparatus of a vehicle includes a measuring module and a triaxial orientation sensor to provide measured axial accelerations in a Cartesian reference system during a certain time interval. The apparatus also includes a triaxial movement sensor to supply at least one angular variation signal proportional to the axial angular speed of the vehicle during the time interval. A processing unit receives a distance signal proportional to the distance traveled by the vehicle in the time interval, receives the at least one angular variation signal, and supplies at least one reference acceleration of the vehicle. An estimator-calibrator block recursively estimates at least one calibrated acceleration as a function of the measured axial accelerations and of the at least one reference acceleration. The estimator-calibrator block includes a calculation unit to calculate an altitude variation as function of the distance signal and recursively calculates an estimated pitch angle as a function of at least one calibrated acceleration.

20 Claims, 13 Drawing Sheets

(51) Int. Cl.
   *B60W 40/107* (2012.01)
   *G01C 21/00* (2006.01)
   *G01C 22/00* (2006.01)
   *G01C 25/00* (2006.01)
   *G01S 19/49* (2010.01)

(52) U.S. Cl.
   CPC ............ *G01C 21/005* (2013.01); *G01C 22/00* (2013.01); *G01C 25/005* (2013.01); *G01S 19/49* (2013.01)

(56) References Cited

U.S. PATENT DOCUMENTS

| | | | | |
|---|---|---|---|---|
| 7,009,558 | B1* | 3/2006 | Fall | G01S 19/47 342/359 |
| 7,246,775 | B1* | 7/2007 | Goodzeit | B64G 1/007 244/164 |
| 7,778,599 | B2* | 8/2010 | Li | H04B 7/0632 455/39 |
| 7,995,989 | B2* | 8/2011 | Wiedeman | H04B 7/18513 455/283 |
| 8,626,441 | B2* | 1/2014 | Matthews | G01C 21/30 701/408 |
| 8,630,796 | B2* | 1/2014 | Sullivan | G01S 5/0036 455/404.2 |
| 9,134,339 | B2* | 9/2015 | Becker | G01B 11/26 |
| 9,159,294 | B2* | 10/2015 | Le Grand | G06F 1/3265 |
| 9,429,590 | B2* | 8/2016 | Czompo | G01P 21/00 |
| 2009/0099774 | A1* | 4/2009 | Takac | A01B 79/005 701/472 |
| 2009/0312975 | A1* | 12/2009 | Wyck Loomis | G01C 5/00 702/96 |
| 2009/0326851 | A1* | 12/2009 | Tanenhaus | G01C 21/16 702/96 |
| 2010/0026568 | A1* | 2/2010 | Capozio | G01S 19/40 342/357.36 |
| 2010/0029198 | A1* | 2/2010 | Hules | H01Q 1/28 455/13.1 |
| 2012/0162006 | A1* | 6/2012 | Palella | G01S 19/426 342/357.22 |
| 2016/0047675 | A1* | 2/2016 | Tanenhaus | G01C 21/16 702/104 |

OTHER PUBLICATIONS

Calibrating a triaxial accelerometer-magnetometer—using robotic actuation for sensor reorientation during data collection, E.L. Renk ; M. Rizzo ; W. Collins ; F. Lee ; D.S. Bernstein Published in: IEEE Control Systems ( vol. 25, Issue: 6, Dec. 2005 ) pp. 86-95 Date of Publication: Dec. 2005 downloaded Aug. 6, 2018.*
Italian Search Report dated Apr. 17, 2015 for corresponding IT Application No. MI20141479, 10 pages.

* cited by examiner $$a_c = \omega v$$
$$a_{t,dr} = dv/dt$$

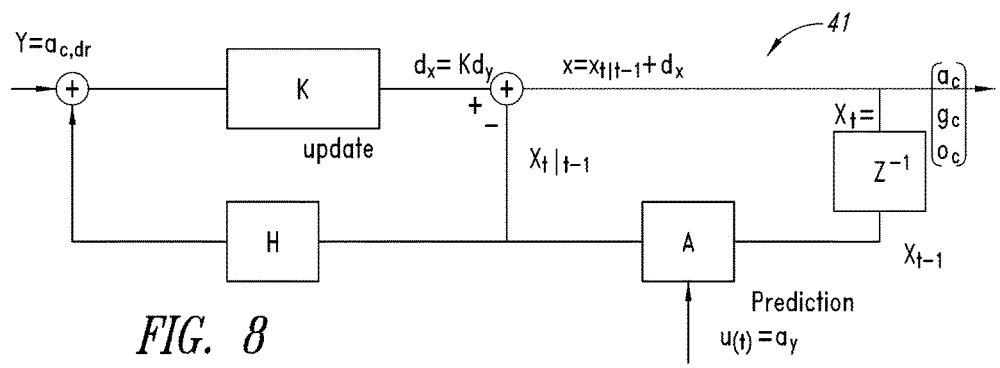
FIG. 6    FIG. 7
FIG. 8
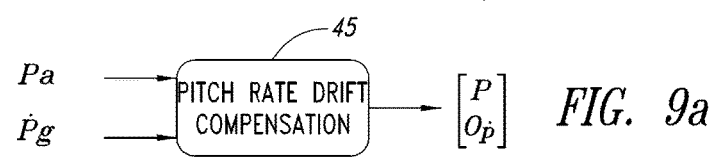
FIG. 9a
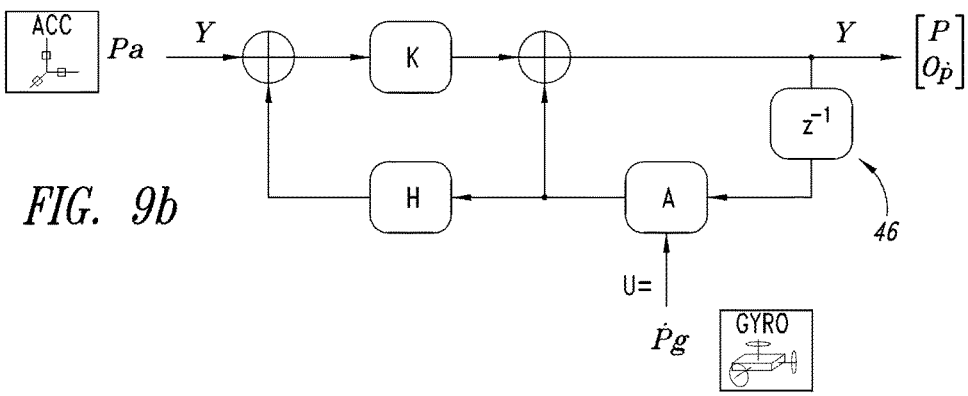
FIG. 9b

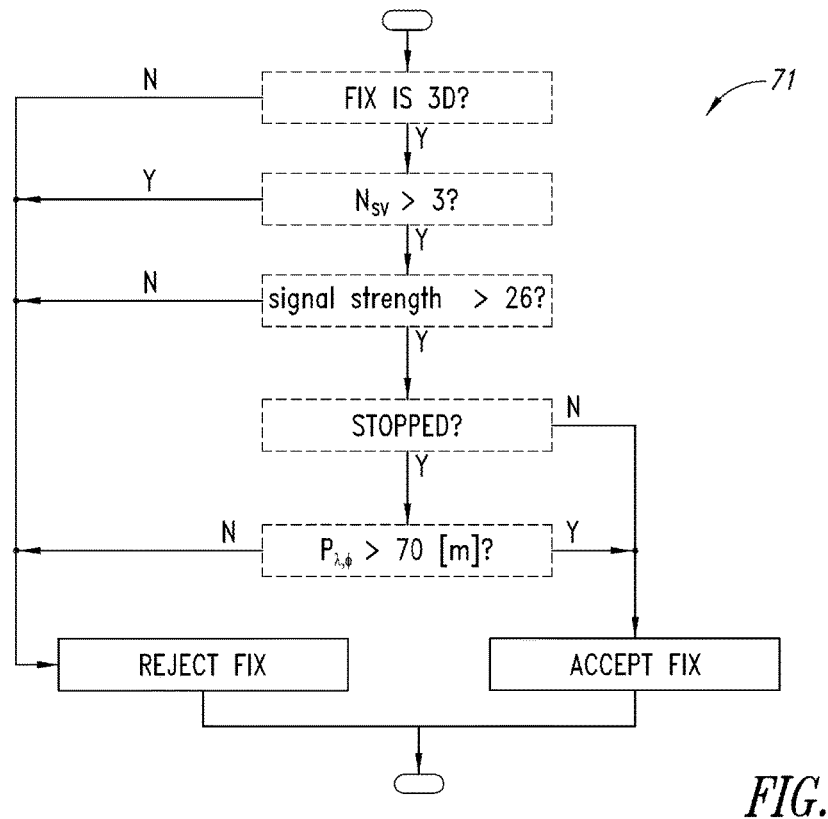
FIG. 17
| j | PARAMETER | WEIGHT |
|---|---|---|
| 0 | Pseudorange residuals RMS [m] | 100 |
| 1 | HDOP | 10 |
FIG. 19
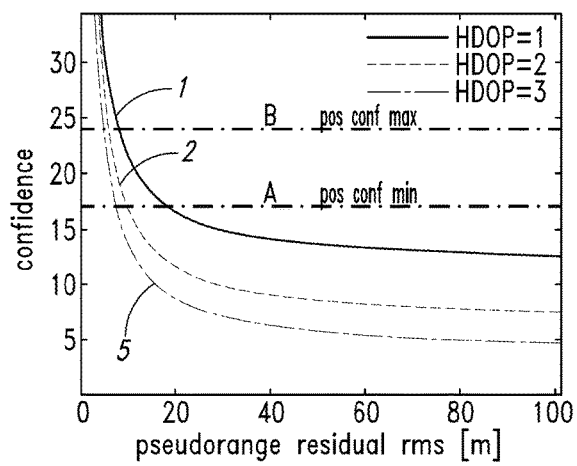
FIG. 20

| POSITION CONFIDENCE LEVEL | $W_{\lambda,\phi}$ |
|---|---|
| HIGH | 1 |
| AVERAGE | 6 |
| LOW | 12 |

| POSITION CONFIDENCE LEVEL | $W_\theta$ |
|---|---|
| HIGH | 10 |
| AVERAGE | 50 |
| LOW | 100 |

POSITIONING APPARATUS AND GLOBAL NAVIGATION SATELLITE SYSTEM, METHOD OF DETECTING SATELLITE SIGNALS

BACKGROUND

Technical Field

The present disclosure refers to a vehicle positioning apparatus.

The present disclosure refers also to a global navigation satellite system of the hybrid-inertial type, comprising such positioning apparatus.

Further, the present disclosure refers to a method of detecting satellite signals of a global navigation satellite system.

Description of the Related Art

As it is known, the global navigation satellite systems or GNSSs, English acronym standing for Global Navigation Satellite Systems, are widely used for locating in real time the position of a vehicle and guiding a vehicle to a requested destination.

The electromagnetic signals supplied by several satellites, are received by a GNSS receiver, are formatted and processed and are capable of supplying an accurate estimate of the vehicle position in terms of: latitude, longitude and altitude above sea level.

In many real cases, for example in an urban environment, possible noises, radio frequency (RF) interferences, reflections of signals, errors in the transmission or spurious transmissions of signals prevent or degrade the integrity of the signals received from the satellites and/or the continuity of the received data, and therefore the positions defined by the GNSS receiver are not correct. The latitude, longitude and altitude values uniquely calculated from the satellite signals can sometimes have an error of tens of meters. In the standard navigation applications, the calculated latitude and longitude are matched on a one-level (two-dimensional) map and, in the presence of the above mentioned errors, this is difficult. In case of multi-level roads, the matching problem is exacerbated by the introduction of the vertical dimension, and therefore it is fundamental to have the height value of the vehicle, for matching the position on the correct level of the map and for obtaining a correct navigation. Moreover, in indoor environments such as parking lots, underground garages, tunnels and similar, the electromagnetic signals supplied by the satellites can completely disappear or are only partially received, and the GNSS receiver is not capable of providing in real time information of correct positions.

A solution provides the use of a Dead Reckoning positioning system, known as DR, supplying the position of an user in a local reference system (North-East), by considering as a reference a known position calculated in the past and updating it until the current instant by measuring the displacement of the user for example by identifying the linear traveled distance and possible changes of direction. The DR systems use an inertial measurement unit, IMU, comprising inertial sensors which generally are mechanical MEMS (acronym standing for Micro Electro Mechanical System) sensors which are economical.

Among the used MEMS sensors, there are accelerometers and monoaxial and triaxial gyroscopes. The accelerometer, when suitably installed, enables determination of the absolute orientation of the inertial measuring unit and therefore of the vehicle with reference to the earth gravitational field. The gyroscope enables detection of possible relative orientation variations (rotations) of the inertial measuring unit, IMU, and therefore of the vehicle.

The hybrid inertial navigation systems enable integration of the satellite signals received by the GNSS receiver and the signals received by the movement sensors and use estimate systems for compensating the drawbacks shown by both such systems.

Despite the fact that the inertial sensors are adequate under several aspects, they are not very reliable in the long term. Even though the inertial sensors are reliable in the short term and insensitive to environmental problems typically troubling the electromagnetic signals, they are prone to errors (caused by the measuring noise and calibration errors) building up with time. Therefore, their performances deteriorate in the long term and the supplied information, such as the position, in other words the longitude and latitude, the altitude, and the speed or heading of the vehicle, are not reliable.

Further, it is well to observe that a navigation device with signals received from a satellites constellation is reliable in the long term, however the obtained data can be incorrect in the short term, for example due to an incorrect or absent reception of signals. The type of contributions given by the two systems is complementary: the GNSS positioning can be incorrect in the short term but is generally accurate in the long term, while the MEMS sensors enable very precise calculation of the displacement in the short term, getting less reliable if they are considered in the long term.

The subject matter discussed in the Background section is not necessarily prior art and should not be assumed to be prior art merely as a result of its discussion in the Background section. Along these lines, any recognition of problems in the prior art discussed in Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The Applicant has observed that the positioning apparatus and system can be made more efficient with reference to the altitude or position calculation of a vehicle, by adopting a technique calibrating the accelerations detected by the measuring instruments. The Applicant has also observed that such calibration technique can be combined and integrated with the measurements supplied by the GNSS systems.

Therefore, an object of the present disclosure is a positioning apparatus as defined in the claims.

Moreover, an object of the present disclosure is a global navigation satellite system and a method of detecting satellite signals as defined in the claims.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. Further characteristics and advantages of the present disclosure will be better understood from the following description of one or more embodiments and of variations provided in an exemplifying and non limiting way, with reference to the attached drawings, wherein:

FIGS. 5, 6 and 7 schematically show formulas and diagrams for recursively calculating an axial component of the acceleration, comprising a predicting step and an updating step;

FIG. 8 shows a diagram of a Kalman filter used for obtaining the second axial acceleration $a_y$;

FIG. 9a shows a processing module used for obtaining the position of a vehicle in an embodiment;

FIG. 9b shows a diagram of a Kalman filter used in the module in FIG. 9a;

FIGS. 10a and 10b respectively show a further processing module used for obtaining the position of a vehicle and a further schematic example of a Kalman filter useable in the module in FIG. 10a;

FIG. 17 shows a control flow of signals received by a satellite system;

FIGS. 19-26 show reference tables used for detecting the soundness of the signals received by a global navigation satellite system according to the present disclosure;

DETAILED DESCRIPTION

Figure 1:
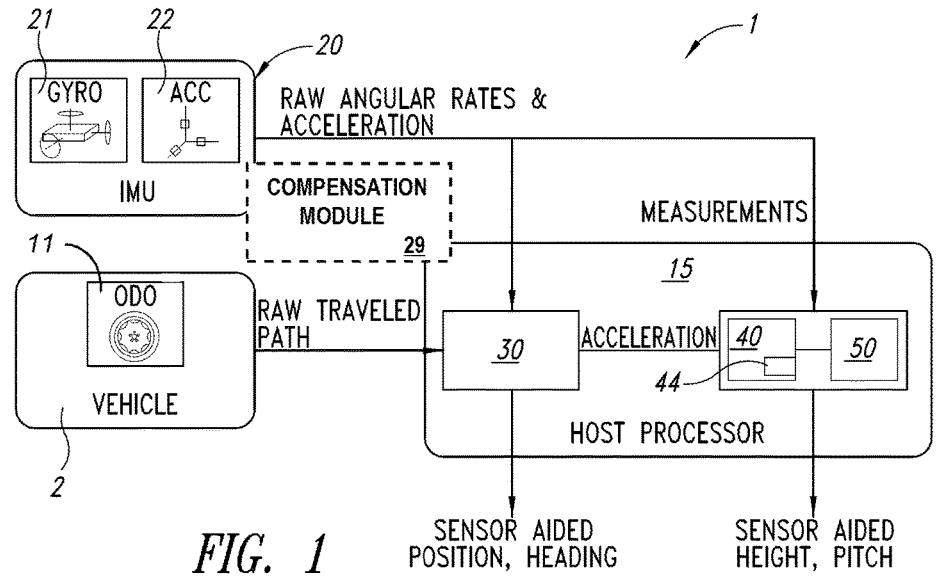
FIG. 1 schematically shows an embodiment of a positioning apparatus.

FIG. 1 schematically shows a positioning apparatus 1 according to a first embodiment, which can be installed on a vehicle 2. The positioning apparatus 1 enables acquisition of a current position of the vehicle 2 at a current time t, in other words the latitude, longitude and altitude, and to calculate the difference in level with respect to an absolute position relative to a previous time $t_{t-1}$.

The positioning apparatus 1 enables calculation of the 3-D position, in other words a three-dimensional position: latitude, longitude and altitude of the vehicle 2, by using a system configured for detecting a current 2-D position and for obtaining the altitude of the vehicle at current time t from a previous altitude calculated at time $t_{t-1}$.

The used system is of the Dead Reckoning type provided with inertial sensors. In the present embodiment, it is also used a non-inertial sensor such as an odometer sensor that in the following description will be simply indicated as odometer. It is well to observe that the odometer information can be obtained by directly connecting it to the analog odometer installed on the vehicle 2, or can be detected by connecting it to a databus of the vehicle, called CAN, English acronym standing for Controller Area Network.

The positioning apparatus 1 comprises a measuring module 20 suitable for detecting some data associated to the vehicle 2 and to a processor block 15 comprising a processing unit 30 configured for processing the detected data, an estimator-calibrator block 40 provided with a calculation unit 44. The calculation unit is configured for estimating, by a recursive calculation, an estimated current altitude, in other words an estimated pitching angle $p_a$ and a current difference in level or altitude variation dh of the vehicle 2 in a time interval Δt, between the current time t and the previous time $t_{t-1}$.

Further, the positioning apparatus 1 comprises a calculation module 50 configured for estimating the current 2-D position of vehicle 2 at current time t. The measuring module 20 comprises a triaxial orientation sensor 22 configured for supplying, at the current time t, a first measured axial acceleration $a_z$, a second axial measured acceleration $a_y$ and a third axial measured acceleration $a_x$ according to the axes of a Cartesian reference system X, Y and Z.

Figure 3:
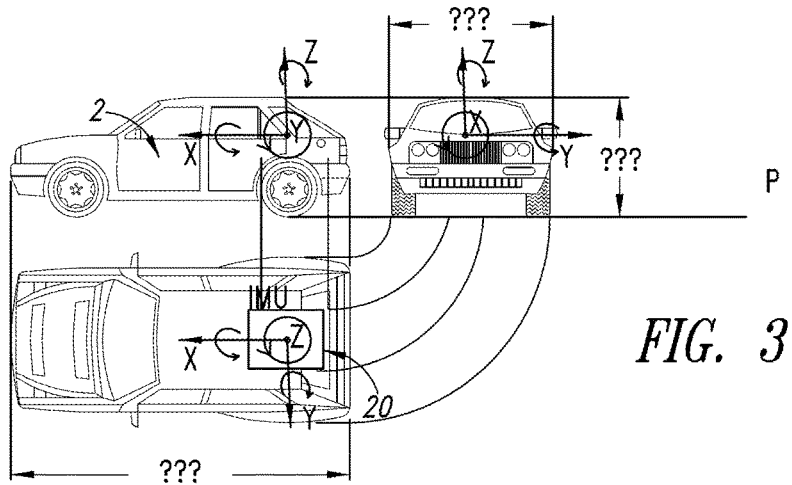
FIG. 3 schematically shows a vehicle provided with a part of the positioning apparatus of FIG. 1.

Further, the measuring module 20 comprises a movement triaxial sensor 21 which is configured for supplying at least one first angular variation signal $\omega_x$, known also as roll variation signal, a second angular variation signal $\omega_y$, known as pitch variation signal and a third angular variation signal $\omega_z$, known as yaw variation signal as shown in FIG. 3. The three angular signals $\omega_x$, $\omega_y$ and $\omega_z$ supply, for each axes of the reference Cartesian system X, Y and Z, the angular rate over time. The three angular signals $\omega_x$, $\omega_y$ and $\omega_z$ are proportional to the respective triaxial angular speeds of vehicle 2 in the time interval Δt and conventionally are expressed in radians per second.

In an embodiment, the orientation sensor 22 is an accelerometer, while the movement sensor 21 is a gyroscope both preferably made with the economical MEMS technology.

Figure 4:
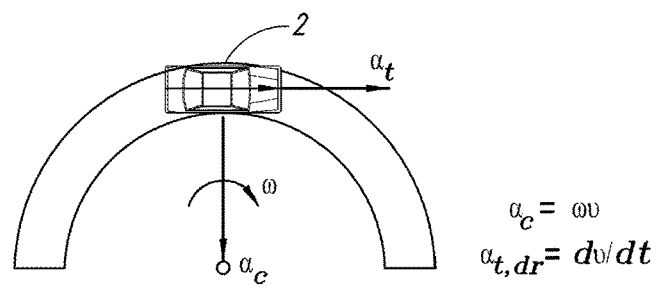
FIG. 4 schematically shows a vehicle and the vectorial components of the accelerations along a bend.
Figure 5:
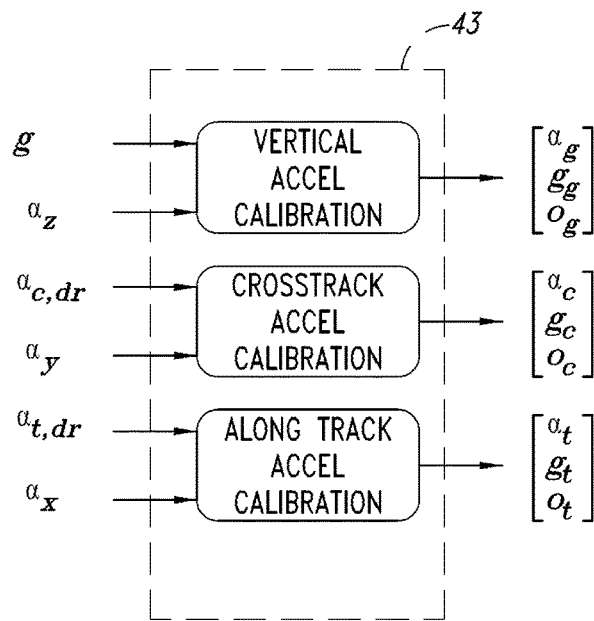

The triaxial accelerometer 22 and gyroscope 21 are installed in the measuring module 20 and are mounted on the vehicle 2 so that the respective axes X, Y and Z, are placed in the same Cartesian coordinate system. Particularly, the axes are oriented according to the axes of a frame or chassis of the vehicle 2, wherein a plane XY is a plane parallel to a plane P of the earth surface which the vehicle 2 lies and moves on, as schematically shown in FIG. 3. In such case:

axis X is a vector belonging to the XY plane which is parallel to the vehicle 2 longitudinal axis and has a direction coinciding with the vehicle 2 movement direction. In the present context, the concept of "longitudinal" movement of vehicle 2 corresponds to the concept of a "tangential" movement of vehicle 2 with respect to a path or track 3, as schematically shown in FIG. 4;

axis Y is a vector normal to the axis X and parallel to a transversal axis of vehicle 2. In the present context, the movement along axis Y corresponds to the concept of the vehicle 2 "centripetal" movement with respect to the path 3;

axis Z is a vector perpendicular to the XY plane having a direction facing away from the plane P. Axis Z substantially corresponds to the gravitational acceleration direction, when the plane P, which the vehicle 2 lies on, is a flat surface.

In an embodiment, the positioning apparatus 1 can comprise an automatic compensation module 29 for the installation of the measuring module 20. The compensation module is configured for calculating offset angles for each axis in order to align the axes X, Y and Z of the measuring module 20 with the axes of the vehicle 2 frame, in order to compensate possible errors caused by the measuring module 20 installation. According to a further embodiment, the offset angles can be obtained by signals from a satellite system, as it will be more evident in the following description.

The processing unit 30 is configured for receiving, from an odometer 11 associated to the vehicle 2, a distance signal $s_{odo}$ proportional to a measured distance d traveled by vehicle 2 in the time interval $\Delta t$. The processing unit 30 is also configured for receiving, from the measuring module 20, the third angular signal or yaw variation signal $\omega_z$ measured in the time interval $\Delta t$.

The processing unit 30 is configured for supplying a first reference speed or tangential speed $v_{t,dr}$ and a first reference acceleration or tangential acceleration $a_{t,dr}$ by differentiating respectively once or twice the distance signal $S_{odo}$ received by the odometer 11, according to the formulas:

$$v_{t,dr} = ds_{odo}/dt \quad (1)$$

$$a_{t,dr} = dv_{t,dr}/dt \quad (2)$$

Further, the processing unit 30 is configured for supplying a second reference acceleration or centripetal acceleration $a_{c,dr}$ by the formula:

$$a_{c,dr} = \omega_z * v_{t,dr} \quad (3)$$

According to an embodiment, it is assumed the vehicle 2 motion is uniform and circular in said time interval $\Delta t$ by particularly considering the time interval $\Delta t$ comprised in a range between 0.05 s and 0.1 s, preferably equal to 0.05 s.

The processing unit 30 is configured for supplying a third reference acceleration g of vehicle 2 according to axis Z.

The estimator-calibrator block 40 is configured for receiving, from the accelerometer 22, the measured axial accelerations $a_x$, $a_y$, $a_z$ and for recursively calibrating a first calibrated acceleration $a_t$, a second calibrated acceleration $a_c$ and a third calibrated acceleration $\hat{a}_g$ of the vehicle 2, referred to the time interval $\Delta t$.

The calibrated accelerations are modeled according to the formulas:

$$\hat{a}_t = g_t(a_x - o_t) \quad (4)$$

$$\hat{a}_c = g_c(a_y - o_c) \quad (5)$$

$$\hat{a}_g = g_g(a_z - o_g) \quad (6)$$

wherein:
- $a_x$, $a_y$, $a_z$ are the first, second and third axial accelerations, independent from each other and obtained by the accelerometer 22;
- $g_t$, $g_c$ and $g_g$ are a first, a second and a third gains estimated value or scale factors in the respective axis, enabling to convert the digital output in a conventional unit of measure;
- $o_t$, $o_c$ e $o_g$ are a first, a second and a third level values at a zero rate level and are obtained by the outputs of the accelerometer 22 without stresses.

The estimator-calibrator block 40 comprises at least one first calibrator 43 capable of calibrating the axial accelerations $a_x$, $a_y$, $a_z$ at the current time t, by using the values of the reference accelerations, $a_{t,dr}$, $a_{c,dr}$, g, obtained by the gyroscope 21 and odometer 11, and the acceleration estimated values in a previous time $t_{t-1}$. This enables removal of the errors due to the accelerometer 22 from the axial accelerations $a_x$, $a_y$, $a_z$.

As it is known, the errors are substantially two:
a) the error caused by the process of manufacturing the accelerometer 22 and this entails that the calibration or adjustment parameters are generally different from the nominal ones mentioned in the respective datasheet;
b) the error caused by environmental circumstances, for example, the temperature.

It is well to observe that, while error (a) is constant over time, error (b) is a source of an error varying over time and therefore is not predictable.

According to an embodiment, schematically shown in FIGS. 5-8, the first calibrator 43 is defined by a mathematical model using a first Kalman filter capable of determining, by a recursive algorithm, the value taken by the variables describing the state of a dynamic system in a current time t starting from the measured inputs and therefore noisy. The variables of the dynamic system are represented by a measured variable Y, an input variable U and by the state of the system in a previous time $t_{t-1}$.

In the shown embodiment, it is possible to define by the outputs of the first Kalman filter 41, the first calibrated acceleration $\hat{a}_t$ and the corresponding first adjustment or calibration parameters of the accelerometer 22, specifically the first gain estimated value $g_t$ and the first level value at a zero rate level $o_t$.

Analogously, it is possible to define the current calibrated accelerations $\hat{a}_c$, $\hat{a}_g$ and the respective first calibration parameters.

Illustratively, the second axial acceleration $a_y$ is calibrated by the first Kalman filter 41 based on the following prediction (7) and update equations (8):

$$\text{Prediction} \quad (7)$$
$$\hat{a}_c = g_c(a_y - o_c)$$
$$A = \begin{bmatrix} 1 & (a_y - o_c) & -g_c \\ 0 & 1 & 0 \\ 0 & 0 & 1 \end{bmatrix}$$
$$\hat{P}_t = AP_{t-1}A^T + Q$$

$$\text{Update} \quad (8)$$
$$a_{c,dr} = \omega v$$
$$da = a_{c,dr} - \hat{a}_c$$
$$H = [1 \ 0 \ 0]$$
$$K = PH^T(HPH^T + R)^{-1}$$
$$a_c = \hat{a}_c + Kda$$
$$P_t = (I - KH)\hat{P}_t$$

Such equations (7) and (8) respectively refer to the prediction and update of the parameters of the considered mathematical model, wherein the measured variable Y is the second reference acceleration $a_{c,dr}$, while the input variable U is the second axial acceleration $a_y$.

The matrix A is a dynamic matrix and matrix $A^T$ is the transposed matrix A, P is the vector representing the estimated error values while the term R is called measured noise and is a diagonal matrix enabling a modeling of the errors which affect the used measurements. The matrix R estimated values refer to the uncertainties about the measurements and can be values suitably chosen by the designer or are obtained by the GNSS signals of a satellite system, as it will be more evident in the following description.

Analogous equations can be obtained for calibrating respectively the first measured axial acceleration $a_x$, as shown in FIGS. 6 and 7, and the third measured axial acceleration $a_z$, by using the first modified Kalman filter 41 or using further and separated first Kalman filters.

Figure 12:
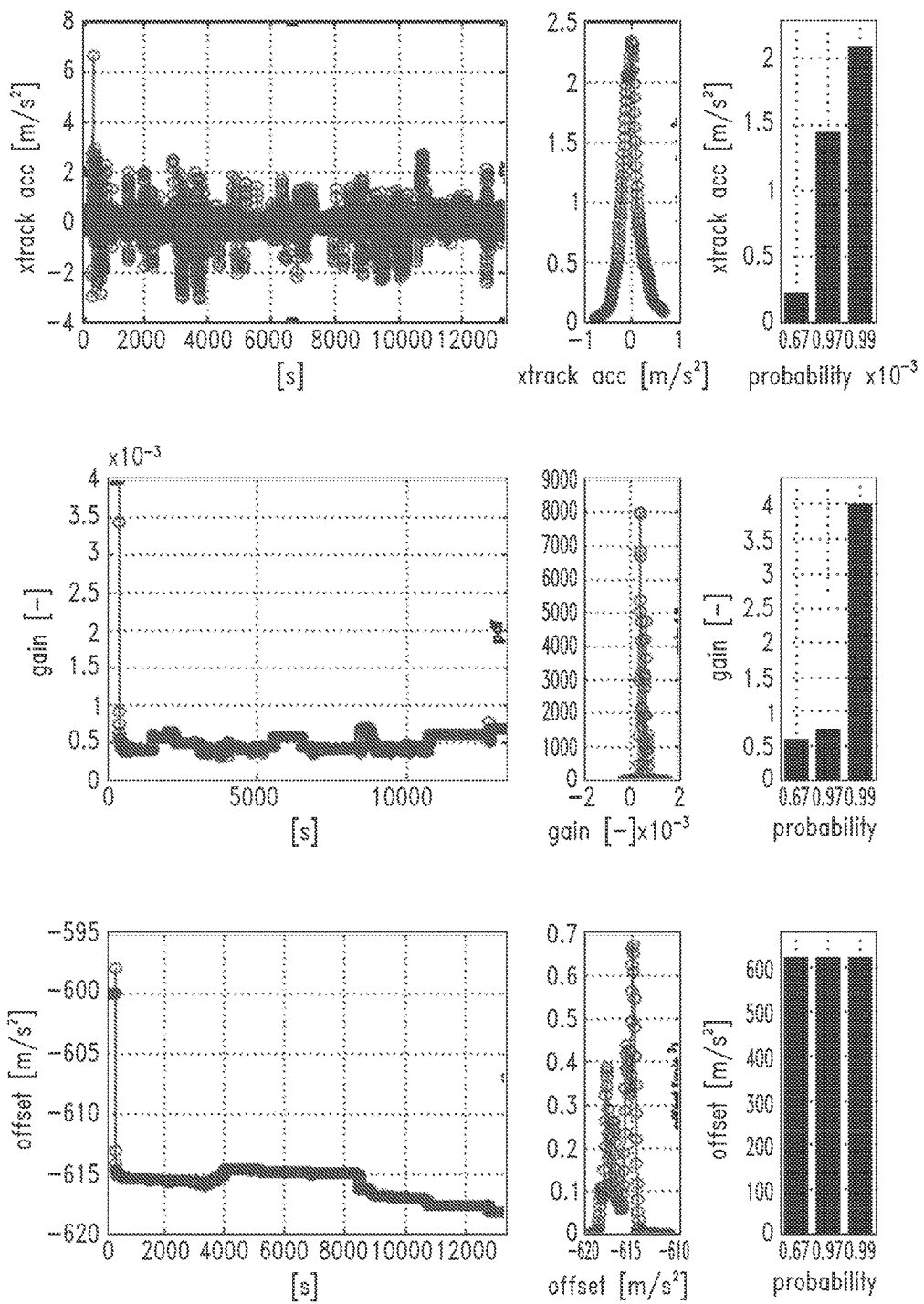
FIG. 12 shows some plots, obtained by using a Kalman filter, respectively regarding a calibrated acceleration plot, a gain or sensibility and an offset with respect to a zero rate level, such plots being detected by the same Applicant.

The diagrams in FIG. 12 represent some plots obtained by using the first Kalman filter 41, such plots refer respectively to the plot of the calibrated acceleration $a_c$ called also cross track, to the gain or sensitivity $g_c$ and to the offset $o_c$ with respect to a zero rate level, and enable evaluation of the soundness of the calibrated accelerations $â_t$, $â_c$, $â_g$. By tests performed by the Applicant, it was observed that the filter is very fast in finding the correct gain and offset values. For example, starting from an initial erroneous value, within the first one hundred seconds of the vehicle 2 movement, the steady state corrected values of $0.5 \times 10^{-3}$ for the gain and of 615 for the offset are determined.

Further, the estimator-calibrator block 40 comprises the calculation unit 44, which is configured for calculating the estimated pitch angle $p_a$ of vehicle 2 at the current time t and also the altitude variation dh of vehicle 2, in other words the difference in level in the time interval $\Delta t$ with respect to the previous position. The calculation unit 44 is configured for receiving from the first calibrator 43, the calibrated accelerations $â_t$, $â_c$, $â_g$ and from the gyroscope 21 the yaw variation signal and the distance signal variation $ds_{odo}$ in other words the distance traveled in the time interval $\Delta t$.

The trigonometry formulas used by the calculation unit 44 are:

$$p_a = A \tan[â_t/\mathrm{sqrt}(â_c^2 + â_g^2)] \qquad (12)$$

$$dh = ds_{odo} * tg(p_a) \qquad (13)$$

The configured modeling, according to the present embodiment, enables acquisition of reliable values of the estimated pitch angle $p_a$ and of the altitude variations dh which are corrected of the errors caused by the accelerometer 22.

The estimator-calibrator block 40 can also comprise a compensation unit 45 which is configured for determining an offset pitch angle $p̂_t$ at the current time t. The compensation unit 45 is configured for receiving, from the calculation unit 44, the estimated pitch angle $p_a$ and for receiving, from the gyroscope 21, the second angular signal $\omega_y$ measured in the time interval $\Delta t$.

The offset pitch angle $p̂_t$ is obtained by the formula:

$$p̂_t = p_{t-1} + (\dot{p}_g - o_p)dt \qquad (14)$$

According to an embodiment, the compensation unit 45 (FIG. 9a) for obtaining the offset pitch angle $p̂_t$ uses a further discrete recursive mathematical model with a second Kalman filter 46 (FIG. 9b), wherein the measured variable Y is the estimated pitch angle $p_a$, at the current time t, while the input variable U is a value of the input pitch angle $\dot{p}_g$ which is obtained through a scaling by a sensitivity value G of the second angular variation signal $\omega_y$ measured by the gyroscope 21. The second Kalman filter 46 is configured by the following predictions (14) and update equations (15):

$$\text{Prediction} \qquad (14)$$
$$\dot{p}_g = G\omega_y G$$
$$\hat{p}_t = p_{t-1} + (\dot{p}_g - o_p)dt$$
$$A = \begin{bmatrix} 1 & -dt \\ 0 & 1 \end{bmatrix}$$
$$\hat{P}_t = AP_{t-1}A^T + Q$$

$$\text{Update} \qquad (15)$$
$$dp = p_a - \hat{p}_t$$
$$H = [1 \ 0]$$
$$K = PH^T(HPH^T + R)^{-1}$$
$$p_t = \hat{p}_t + Kdp$$
$$P_t = (I - KH)\hat{P}_t$$

wherein:

G is a sensitivity value which can be assumed equal to the sensitivity value for the gyroscope 21 axis z, calculated by considering calibration values of the instruments or obtained by a calibration operation through a global navigation satellite system GNSS couplable with the gyroscope 21;

dt is the time interval between two samples measured by the gyroscope 21;

$o_p$ is the offset value or calibration parameter of the gyroscope 21 with reference to the axis Y without angular rotations;

$p_t$ is the estimated pitch value at the current time t.

It is to be observed that the offset value of the gyroscope along the three axes is generally different, while the sensitivity value G is generally estimated along the axis Z and is considered similar along the axes X and Y, being less dependent on environmental factors such as for example the temperature. Further, the effects on the long term integration of an error on the value G are less harmful than the ones of an error on the offset value. Indeed, the offset error is always present in the detected measurements, while the gain error is present only when there is an orientation change (for example a bend, referring to the third angular variation signal $\omega_z$).

The second Kalman filter 46 enables offset of the detected values by the sensors by averaging the errors which could occur by singularly considering the values measured by the gyroscope 21 and by the accelerometer 22. The value measured by the gyroscope 21 could be subjected to a lack of uniformity because it is subjected to an error as a function of the environment temperature or could also comprise a drift value which, if not corrected, increases as a function of the time with an increasingly relevant incidence. The value measured by the accelerometer 22 is subjected to an error as a function of the noise which is generally high due to the vehicle 2 vibration.

Figure 10A:
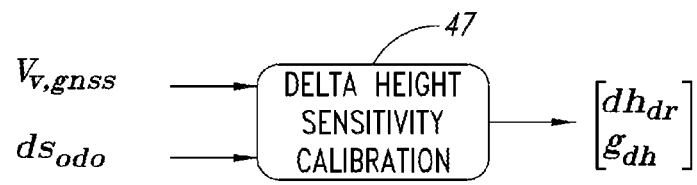

According to an embodiment, the estimator-calibrator block 40 comprises a second calibrator 47 configured for calibrating the altitude variation dh of vehicle 2 and for obtaining a calibrated altitude variation $dh_{dr}$ (FIG. 10a).

The second calibrator 47 is configured for receiving, from the compensation unit 45, the offset pitch angle $p̂_t$, and, from the odometer 11, the distance signal $S_{odo}$, and for obtaining the calibrated altitude variation $dh_{dr}$ according to the formula:

$$dh_{dr} = g_{dh} ds_{odo} \sin(p̂_t) \qquad (16)$$

wherein:

gdh is an estimated correction factor, in other words a scale value regarding the altitude variation dh, used for offsetting misalignments or small inaccuracies which can be present in the distance signal $s_{odo}$ calibration in the calculated pitch;

$p̂_t$ is the offset pitch angle.

Figure 10B:
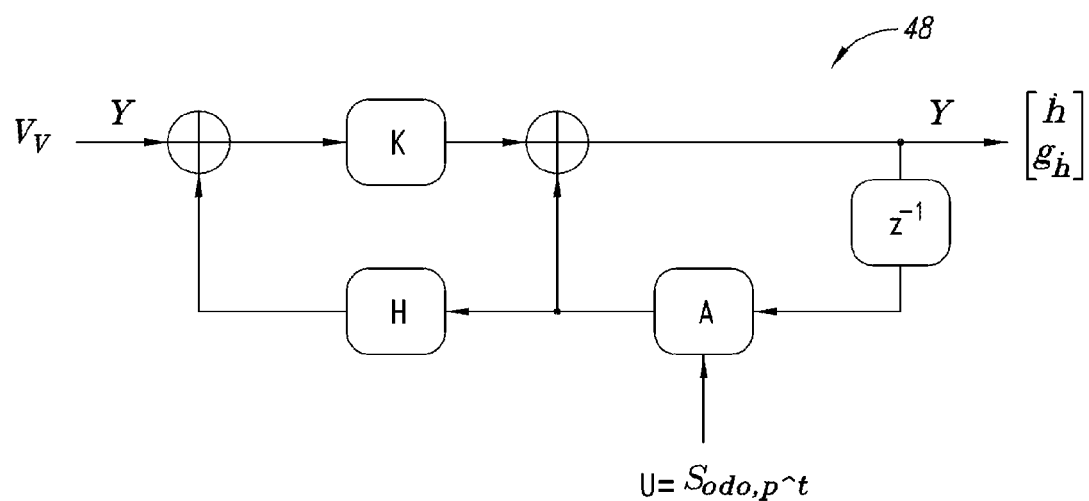

The second calibrator 47 is defined by a further discrete recursive mathematical model using a third Kalman filter 48 wherein the measured variable Y is the value of a vertical measured speed $v_v$ which can be obtained by a suitable pressure sensor or can be provided by the satellite system GNSS, while the input variables U are two and particularly the distance signal $S_{odo}$ and the offset pitch angle $\hat{p}_t$. The third Kalman filter 48 (FIG. 10*b*) is configured by the following prediction equations (17) and by the following update equations (18):

Prediction (17)

$$\hat{h}_t = g_h v \sin(p)$$
$$A = \begin{bmatrix} 1 & v\sin(p) \\ 0 & 1 \end{bmatrix}$$
$$\hat{P}_t = AP_{t-1}A^T + Q$$

Update (18)

$$dh = v_v - \hat{h}_t$$
$$H = [1 \ 0]$$
$$K = PH^T(HPH^T + R)^{-1}$$
$$h_t = \hat{h}_t + Kdh$$
$$P_t = (I - KH)\hat{P}_t$$

wherein:

$H_t$ represents the offset altitude variation or vertical speed at the current time t;

$h_t$ represents the estimated altitude variation at current time t;

$\hat{p}_t$ is the offset pitch angle;

v is the measured horizontal speed calculated by the distance signal $ds_{odo}$, obtained by the odometer 11;

$v_v$ is the vertical speed.

It can be observed that the prediction equations 17 are based on the gain estimated factor $g_{dh}$ and on the input variables U which are the offset pitch angle $\hat{p}_t$ and the distance signal $S\_{odo}$.

The calculation module 50 is therefore configured for receiving, from the second calibrator 47, the variation of the offset altitude $dh_{dr}$ and for obtaining an altitude estimated value $h_{dr,t}$ at current time t, which is an absolute-type altitude, obtained by integration with the formula:

$$h_{dr^-(t)} = h_{dr(t-1)} + dh_{dr(t-1)} \quad (19)$$

The altitude estimated value $h_{dr,t}$ obtained by the formula 19 is corrected by the calculation module 50 itself through an absolute height reference which can be provided by the suitable pressure sensor $h_{pres(t)}$ or by the satellite system GNSS.

The calculation module 50 can use a further recursive mathematical model, for modeling, by a prediction and update, the present variables. The further mathematical model enables calculation of the altitude value $h_t$ at the current time t by the estimated altitude values according to the formula:

$$h_{dr(t)} = \alpha * h_{dr^-(t)} + (1-\alpha) * h_{pres(t)} \quad (20b)$$

in the presence of a pressure sensor or $$h\_dr(t) = \alpha * h_{dr^-(t)} + (1-\alpha) * _{gnss(t)} \quad (20a)$$

in the presence of a satellite system GNSS.

Alternatively, the calculation module 50 can comprise a fourth Kalman filter wherein the measured variable Y is the absolute detected altitude h obtained by the previous height provided through the pressure sensor $h_{pres(t)}$ or by the satellite signals provided by a global satellite system GNSS, and wherein the input variable U is the offset altitude variation $dh_{dr}$.

The obtained positioning apparatus enables acquisition of, alternatively to the known solutions, the difference in level of a vehicle by calibrating and offsetting the measurements obtained by the instruments through a prediction and an update of the same.

The present disclosure refers also to a global navigation satellite system GNSS, of the hybrid-inertial type, comprising a constellation of satellites configured for supplying a plurality of satellite electromagnetic signals to at least one navigation device 100 comprising a satellite receiver 3. The navigation device 100 comprises a positioning apparatus 1 made according to what has been previously described and illustrated. In the following description, parts and details already described and previously shown will be indicated by the same reference numbers and signs.

The satellite receiver 3 is configured for receiving and processing the satellite electromagnetic signals supplied by said satellites, and configured for extracting from said satellite signals respective output signals: Pseudorange (i), Doppler (i), Cn0 (i) regarding the vehicle 2.

Figure 13:
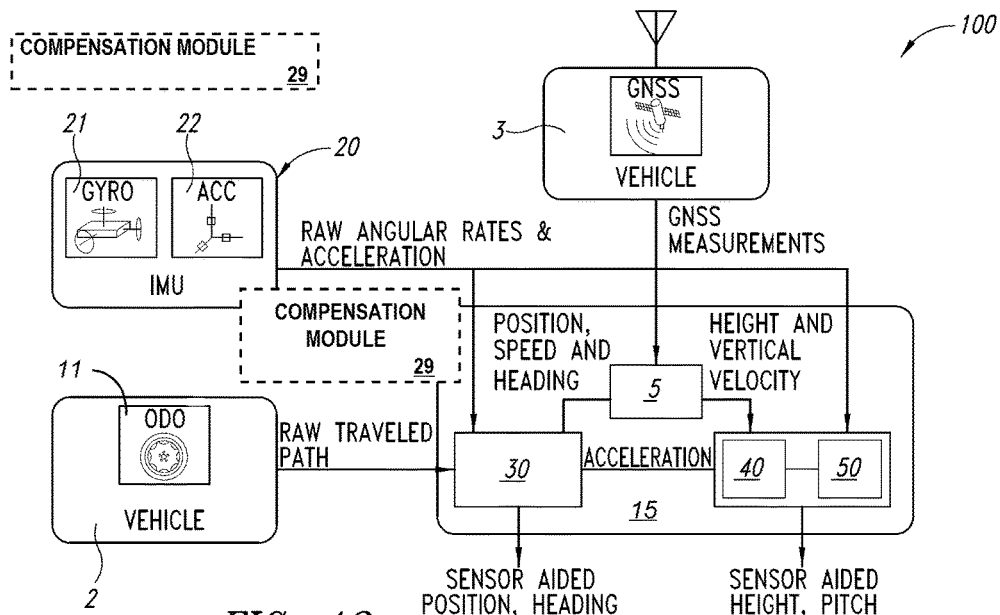
FIGS. 13 and 14 schematically show an embodiment of a navigation device of the hybrid type and a corresponding flow chart.

According to an embodiment, the navigation system 100, illustrated in FIG. 13, comprises the measuring module 20 suitable for detecting, through the movement sensor or gyroscope 21 and the orientation sensor or accelerometer 22, some data associated to a vehicle 2 in a time interval $\Delta t$, between a current time t and a previous time $t_{t-1}$. Further, the navigation device 100 comprises the processor block 15 provided with the processing unit 30 configured for processing the detected data, of the estimator-calibrator block 40 comprising the calculation unit 44 and the calculation module 50 which are configured for estimating, at the current time t, the 2-D current position and an altitude variation dh of vehicle 2.

Figure 14:
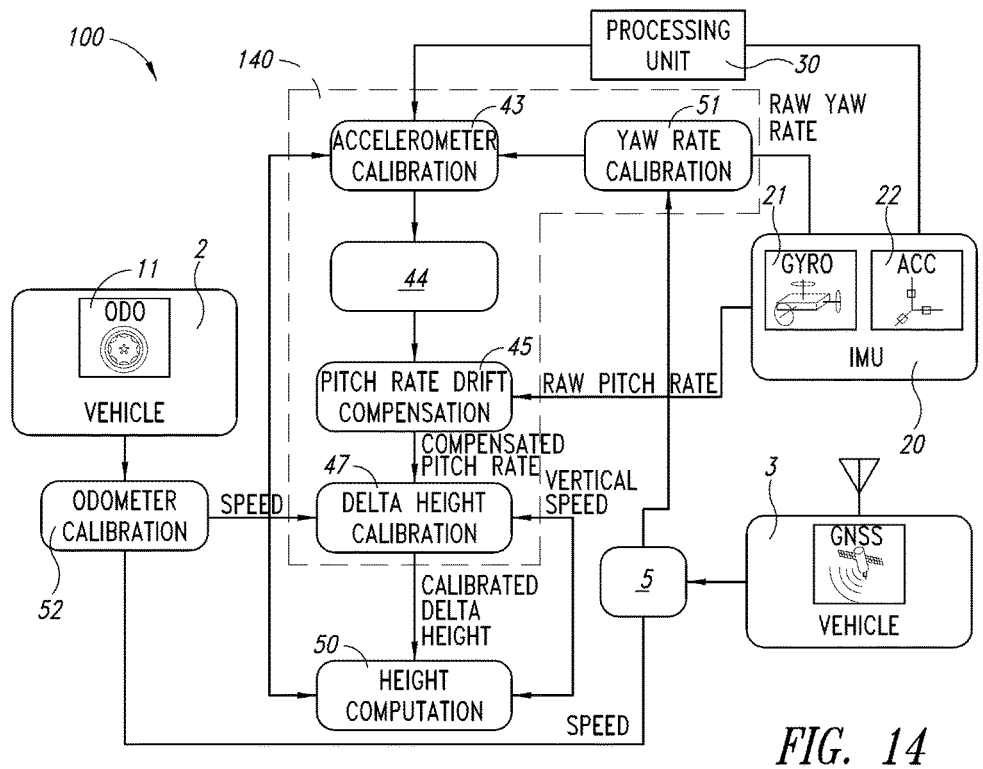

Particularly, the processor block 15 of the navigation device 100, illustrated in FIG. 14, comprises a processing block 5 configured for receiving the output signals: Pseudorange (i), Doppler (i), Cn0 (i) from the receiver 3 and for extracting from the same some current parameters, Position $P_t$, Speed $V_t$ and Time t regarding said vehicle 2 and configured for estimating the soundness of the received satellite signals and also the reliability of the detected data and information. Further, the processing block 5 is configured for computing quality metrics of the extract parameters PST: Position, Speed and Time.

With reference to FIGS. 15-26, an embodiment and a calculation method of the processing block 5 will be now described.

By considering that the satellites are N, the processing block 5 receives, from receiver 3, N pairs of a pseudorange measurements $\varphi(i)$ and a Doppler measurement $d(i)$.

The pseudorange measurement $\varphi(i)$ is representative of the time interval taken by the signal to reach the vehicle 2 from the satellite, such pseudorange measurement $\varphi(i)$ is affected by an average pseudorange error $\sigma_\varphi^{RMS}$ which is estimated by the processing block 5 as a function of the measurements of all the satellites.

Further, the processing block 5 receives, from the receiver 3, and for each satellite, a parameter measuring the strength of the received signal $c_{n0}(i)$ and also the parameter HDOP, English acronym standing for Horizontal Dilution of Precision, a parameter supplying an indication about the arrangement of the geometric satellites constellation.

The processing block 5 receives, from the odometer sensor 11, the speed signal $v_{odo}$ derived by the distance signal $s_{odo}$.

According to an embodiment, the processing block 5, comprises a calculation module $PVT_{GNSS}$ 61 and a quality evaluation module 62 receiving the parameters: pseudorange measurement $\varphi(i)$, Doppler measurement $d(i)$ and signal strength measurement $c_{n0}(i)$.

The calculation module $PVT_{GNSS}$ 61 is configured to obtain, using estimation algorithms, by for example Kalman filters, the vehicle 2 parameters such as: the current position $P_t$, the current speed $V_t$ and the current time t.

Figure 15:
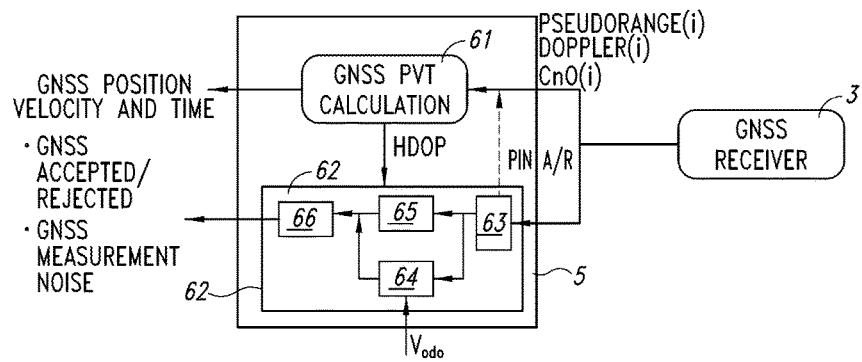
FIGS. 15 and 16 respectively show a schematic block diagram of a portion of a navigation device of the hybrid type and a flow chart of a method of detecting satellite signals.

The quality evaluation module 62, according to the embodiment illustrated in FIG. 15, comprises an initial analysis unit 63, a calculation unit 64, a confidence unit 65 and a GNSS unit 66 for estimating the noise in the GNSS measurements.

The quality evaluation module 62 enables generation of parameters, such as a latitude error $r_\lambda$, a longitude error $r_\Phi$ and an altitude error $r_\theta$, which are directly used by the estimator-calibrator block 40 and by the calculation module 50 for obtaining the estimation of the vehicle 2 altitude variation dh, as it will be better understood in the following description.

The initial analysis unit 63 is configured for analyzing the signals received by the receiver 3 and for obtaining the GNSS condition "Accept/Reject". A control flow 71 of the initial analysis unit 63 is indicatively shown in the diagram of FIG. 17. When the GNSS condition is "Reject", the positioning apparatus 1 is configured for calculating the vehicle 2 altitude variation dh without using the GNSS signals, as previously described.

Figure 18:
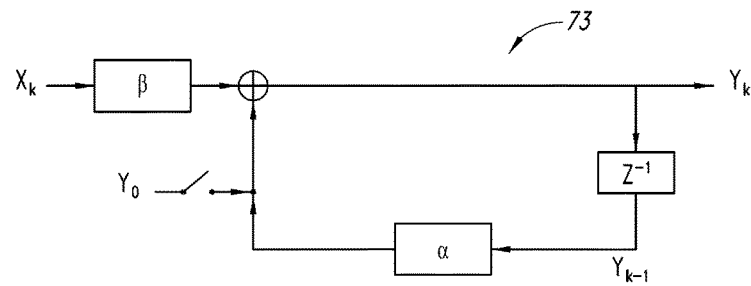
FIG. 18 shows a diagram of an IIR filter in an embodiment.

In case the GNSS condition is "Accept", the received GNSS signals are processed by the calculation unit 64 by, for example, an IIR filter 73 of the first order, schematically represented in FIG. 18 and wherein $x_k$ is the current input variable, $y_k$ is the current output variable, and $y_{k-1}$ is the previous output variable and $y_0$ is an input for an initialization parameter. The transfer function of the IIR filter 73 is represented by the formula:

$$Y_K = \frac{B}{1 - AZ^{-1}} X_K = IIR(X_K) \quad (21)$$

wherein the current output $y_k$ is obtained by summing two components:
1) the previous output $y_{k-1}$ modulated by the coefficient $\alpha$;
2) a new input $x_k$ modulated by the coefficient $\beta$, wherein the coefficient $\beta$ is equal to $(\alpha-1)$.

The coefficient $\alpha$ is called memory of IIR filter 73 and determines how much the current output value $x_k$ is influenced by the previous output $y_{k-1}$.

The calculation unit 64 is configured for calculating, separately and independently from each other, at least one first x1, one second x2 and one third inlet parameters x3 and for supplying corresponding indicators. Particularly, by filtering the first input parameter x1, an error of the estimated precision of the GNSS position $\in_{\lambda,\varphi}$ is obtained:

$$\in_{\lambda,\varphi} = IIR(\Sigma_P^{RMS} \cdot HDOP) \quad (22)$$

wherein $\Sigma_P^{RMS}$ is the RMS value of the pseudorange error and HDOP is the horizontal dilution of the prediction.

It is well to observe that the RMS value consists of summing the squares of the errors of the signals received by the satellites, calculating the square root of such sum and dividing by the satellites number.

The filtering of the second input parameter x2 generates a precision error $\in_v$ of the estimated GNSS speed:

$$\in_v = IIR(\sigma_d^{RMS} \cdot HDOP) \quad (23)$$

wherein $\Sigma_P^{RMS}$ is the RMS value of the Doppler error.

By supplying the IIR filter 73 with the third input parameter x3, an indication of the carrier-noise ratio cn0 is obtained:

$$cn_0 = IIR\left(\frac{1}{C}\sum_{c=1}^{C} cn_{0c}\right) \quad (24)$$

wherein $$\frac{1}{C}\sum_{C=1}^{C} CN_{0C}$$

is an average value of the signal strength cn0 between all the tracked satellites.

Then, the estimation GNSS unit 66 is configured for verifying the estimated precision error of the GNSS position $\in_{\lambda,\varphi}$, the precision error $\in_v$ of the estimated GNSS speed and the carrier-noise ratio cn0, with further indicators supplied by the confidence unite 65 for defining the conditions and soundness of the GNSS signals with a plurality of reference/threshold values.

According to an embodiment, the confidence unit 65 is configured for defining a first confidence value $\gamma_{\lambda,\varphi}$ regarding the satellites positions as a function of an error filtered amount. The first confidence value $\gamma_{\lambda,\varphi}$ is defined by the equation:

$$\gamma_{\lambda,\varphi} = \Sigma_{j=0}^{1} a_j / b_j \quad (25)$$

wherein the parameters a and b of the summation are for example indicated in the table in FIG. 19, wherein:
$b_0$ is the pseudorange average error $\Sigma_P^{RMS}$ having weight $a_0 = 100$ and
$b_1$ is the HDOP parameter with weight $a_1 = 10$.

The confidence unit 65 is also configured for defining a second confidence value $\gamma_\theta$ regarding the vehicle 2 detected speed and calculated as a difference, in absolute value, between a vehicle speed measured by the GPS and the speed value $v_{odo}$ received by the odometer 11, according to the formula:

$$\gamma_\theta = |v_{GPS} - v_{odo}| \quad (26)$$

The second confidence value $\gamma_\theta$ is compared with a lower threshold $S_{\gamma\theta}^{MIN}$ and if it is greater than the lower threshold, the GNSS speed value is considered for calculating the altitude variation dh. In an embodiment, if the detected speed is greater than the lower threshold $S_{\gamma\theta}^{MIN} = 3$ [m/s], then the GNSS measurements can be considered as acceptable.

The estimation GNSS unit 66 of the noise of the GNSS measurements is configured for calculating the soundness of the GNSS received signals and their possible use. According to an embodiment, the first confidence value $\gamma_{\lambda,\varphi}$ of the satellites position is compared with first reference tables, for example the one shown in FIG. 20, by empirically defining the belonging region, as shown in Table 21, wherein:
the lower confidence is defined by the lower region at a first level line A:

$$\gamma_{\lambda,\varphi} < \Gamma_{\lambda,\varphi}^{MIN}$$

the upper confidence is defined by the upper region at a second level line B:

$$\gamma_{\lambda,\phi} \geq \Gamma_{\lambda,\phi}^{MAX}$$

the average confidence is defined by the region comprised between the first A and second level lines B:

$$\Gamma_{\lambda,\phi}^{MIN} < \gamma_{\lambda,\phi} < \Gamma_{\lambda,\phi}^{MAX}$$

In the table of FIG. 20, the upper confidence region is greater than the value $\Gamma_{\lambda,\phi}^{MAX}=24$, and the lower confidence region is less than the value $\Gamma_{\lambda,\phi}^{MIN}=17$.

When the first confidence value $\gamma_{\lambda,\phi}$ is:
lower: the GNSS signals received by the satellites are rejected and are not used for calculating the altitude variation dh of vehicle 2;
average: the GNSS signals received by the satellites are partially used for the altitude variation dh of vehicle 2;
upper: the GNSS signals heavily affect the calculation for determining the vehicle 2 altitude variation dh.

The table in FIG. 20 shows some curves 1, 2 and 5 regarding the HDOP value and it is possible to observe that for the same pseudorange value, the lower the confidence is the higher the HDOP value is.

The estimation GNSS unit 66 is also configured for determining an error or uncertainty of the GNSS measurements. According to an embodiment, the latitude error $r_\lambda$ is calculated by the formula (27), while the longitude error $r_\phi$ is calculated by the formula (28):

$$r_\lambda = w_{\lambda,\phi} \alpha^2 (\sigma_{\lambda,\phi} + \sigma_{cn0} + \sigma_{HPE} + \sigma_\rho^{RMS} \cdot \text{HDOP})^2 \quad (27)$$

$$r_\phi = w_{\lambda,\phi} \beta^2 (\sigma_{\lambda,\phi} + \sigma_{cn0} + \sigma_{HPE} + \sigma_\rho^{RMS} \cdot \text{HDOP})^2 \quad (28)$$

wherein:
$w_{\lambda,\phi}$ is a first amplification factor regarding the satellites position and is a value obtained as a function of the belonging region of the first confidence value $\gamma_{\lambda,\phi}$ by suitable second tables, as the table shown in FIG. 24;
$\alpha$ and $\beta$ are fixed values obtainable from suitable tables;
$\sigma_{\lambda,\phi}$ is an error regarding the satellites position;
$\sigma_{cn0}$ is an error regarding the received GNSS signal strength;
$\Sigma_\rho^{RMS} \sigma_{HPE}$ is an error which is obtained by a Horizontal Position Error known under the acronym HPE;
is the pseudorange error.
HDOP is the prediction horizontal dilution.

According to an embodiment, the latitude error $r_\lambda$ is considered when the carrier-noise ratio cn0, in other words the received GNSS signal strength, is less than 32 dB, while the longitude error $r_\phi$ is considered when the precision $\in_{\lambda,\phi}$ of the estimated GNSS position, calculated by the function 22, is greater than 150 m. Such parameters are defined by the calculation unit 64.

The calculation unit 64 is configured for defining the heading error or horizontal direction $r_\theta$ which, in an embodiment, is calculated by the formula:

$$r_\theta = w_\theta (r_s + r_{\Delta,\theta}) \quad (29)$$

wherein:
$\omega_\theta$ is a second noise error referring to the satellite's position and is a value obtained as a function of the belonging region of the first confidence value $\gamma_{\lambda,\phi}$ by suitable third tables, for example the table shown in FIG. 25.

The value $r_s$ modulates the error regarding the vehicle speed and is obtained by the formula:

$$r_s = d \cdot a \, \tan(\mu/v_{odo}) \quad (30)$$

wherein d is a value inserted with reference to the soundness of the GNSS signal Doppler and particularly is evaluated when:

$$\sigma_d^{RMS} \cdot \text{HDOP} > 2 M/S$$

$\mu$ is a constant value;
$V_{odo}$ is the speed value obtained by the distance value $d_{odo}$ received by the odometer 11.

Figures 24, 25, 26:
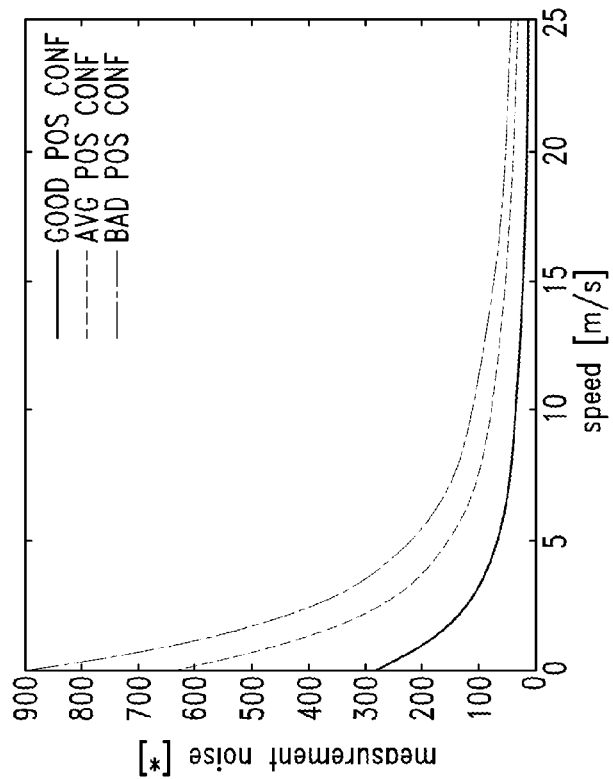

In the chart shown in FIG. 26, the noise of the measurements regarding the vehicle 2 current speed is represented. As it is known, the more the vehicle speed is high, the more accurate and precise the measurements obtained by the GNSS signals sent by the satellites are.

To summarize, the calculation module $PVT_{GNSS}$ 61 and the quality evaluation module 62 supply the following parameters:
position P, current speed V and current time, t and also: the latitude error $r_\lambda$, the longitude error $r_\phi$ and the heading error $r_\theta$.

Particularly, the latitude error $r_\lambda$, longitude error $r_\phi$ and heading error $r_\theta$ are used as values to define:
the matrix R of the measurements is particularly the diagonal matrix having along the diagonal the prediction errors: $r_\lambda$, $r_\phi$ and $r_\theta$ and is used in the above mentioned update equations 8, 15 and 18, for obtaining the update values of the state variables.
the matrix Q in other words the process noise matrix enables modeling of the inaccuracy of the calibration of the used sensors.

The calculation of the altitude variation dh and therefore the absolute altitude h is therefore performed substantially analogously to what has been previously described, by an estimator-calibrator block 140 which analogously to the above described estimator-calibrator block 40 uses the parameters obtained by the processing block 5.

Thanks to the presence of the initial analysis unit 63, in the quality evaluation module 62, the parameters $P_t$, $V_t$, $T_t$ obtained by the current satellite GNSS signals are used only in case the condition A/R is accept.

In this case, the calculation module $PVT_{GNSS}$ 61 is configured for supplying to the second calibrator 47, a value of the obtained current vertical speed $v_{v,gnss}$ and also for supplying to the calculation module 50 a detected altitude value $h_{GNSS}$.

Further, with reference to FIG. 14, the calculation module $PVT_{GNSS}$ 61 of the processing block 5 is configured for supplying to a third calibrator 51, the parameters $P_t$, $V_t$, $T_t$ obtained by the output signals: Pseudorange (i), Doppler (i), Cn0 (i). Particularly, the third calibrator 47 enables estimation of a sensibility G of the gyroscope 21 by using as a reference the current information or satellite measurements.

The third calibrator 51 is configured for receiving from the measurement module 20 the third angular variation signal co, or yaw angle measured by the gyroscope 21, and for receiving from the processing block, the parameters $P_t$, $V_t$, $T_t$ and the latitude $r_\lambda$, longitude $r_\phi$ and altitude errors $r_\theta$, and for recursively calculating by a mathematical recursive model a calibrated yaw angle $\ddot{\omega}_z$. Particularly, the third calibrator 51 enables correction of possible errors introduced by the gyroscope 21 using the satellite GNSS signals.

The mathematical model used by the third calibrator 51 can be a further Kalman filter, a least squares algorithm or an alpha filter or an IIR filter.

The estimator-calibrator block 140 can also comprise a fourth calibrator 52 configured for receiving from the odometer 11, the distance signal $s_{odo}$ and for receiving from the calculation module $PVT_{GNSS}$ 61 the current speed signal $V_t$, for recursively calculating a calibrated distance value ŝ. The fourth calibrator 52 can use a further recursive mathematical model which can be a further Kalman filter, a least squares algorithm or an alpha filter or an IIR filter. The fourth calibrator 52 is also configured for calculating a calibrated speed v̂ obtained by the calibrated distance value ŝ traveled by the vehicle 2 in the time interval Δt.

Figure 16:
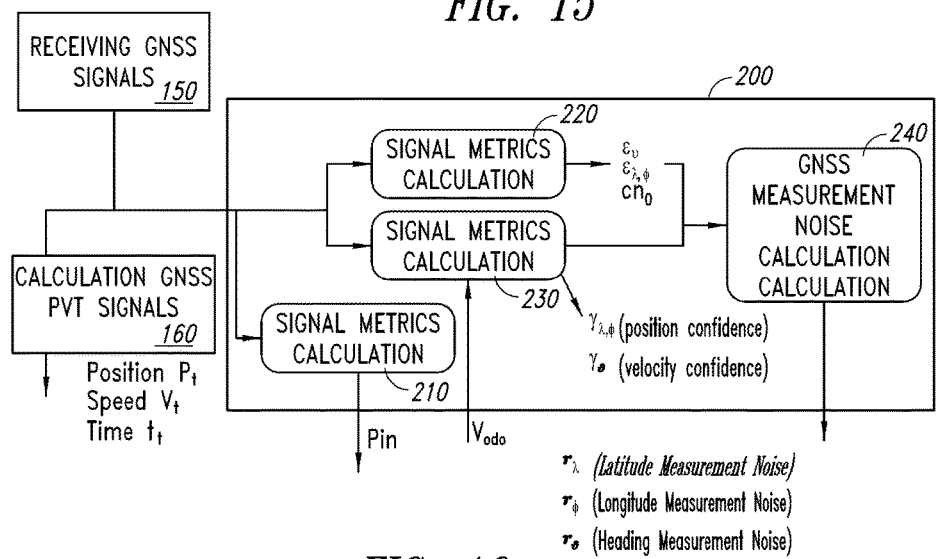

With reference to the navigation device 100 of the inertial-hybrid type, an example of its method 200 of detecting satellite GNSS signals, as schematically shown in FIG. 16, will be now described.

The navigation device 100 receives (150) the satellite GNSS signals which are analyzed (160) for calculating, by for example the calculation module $PVT_{GNSS}$ 61, parameters such as: the current Position $P_t$, the current Speed $V_t$ and the current Time t of the vehicle 2.

The received satellite GNSS signals are also analyzed for calculating (200) parameters such as: a latitude error $r_\lambda$, a longitude error $r_\Phi$ and a heading error $r_\Theta$ enabling expression of the quality of the parameters obtained by the received satellite GNSS signals through, for example, a quality evaluation module 62.

According to an embodiment, the calculation (200) of the quality provides a pre-evaluation (210) for comparing the received GNSS signals with suitable threshold values and for determining, based on the value of the comparison, a condition Accept/Reject identifying if the GNSS signals are deemed acceptable and therefore are analyzed, or rejected.

In an embodiment, the pre-evaluation (210) could be made before the analysis (160) for calculating the parameters.

With reference to the accepted GNSS signals, the quality calculation (200) provides a signal metrics (220) for evaluating, through for example the calculation unit 64, whether the parameter obtained by the GNSS signals are reliable or not. The signal metrics (220), in an embodiment, uses the IIR filter 73 of the first order schematically represented in FIG. 18 and previously described, which separately and independently from each other filters:

the first input parameter (x1) for obtaining the estimated precision of the GNSS position $\in_{\Lambda,\Phi}$.

$$\in_{\lambda,\phi} = IIR(\sigma_p^{RMS} \cdot HDOP) \quad (22)$$

wherein $\Sigma_P^{RMS}$ is the RMS value of the pseudo-range error and HDOP is the horizontal dilution of the prediction.

the second input parameter (x2) for obtaining the precision $\in_v$ of the estimated GNSS speed:

$$\in_v = IIR(\sigma_d^{RMS} \cdot HDOP) \quad (23)$$

wherein $\Sigma_D^{RMS}$ is the RMS value of the Doppler error.

the third input parameter (x3) for obtaining the carrier-noise ratio cn0:

(24)

$$cn_0 = IIR\left(\frac{1}{C}\sum_{c=1}^{C} cn_{0c}\right)$$

wherein $$\frac{1}{C}\sum_{C=1}^{C} CN_{0C}$$

is an average value of the signal strength cn0 among all the tracked satellites.

Further, the quality calculation (200) provides a confidence definition (230) of the calculated parameters, through, for example, the confidence unit 65, wherein it provides to define a first confidence value $\gamma_{\lambda,\phi}$ as a function of the satellites position by considering the filtered error amount, and a second confidence value $\gamma_\Theta$ as a function of the vehicle speed.

According to an embodiment, the first confidence value $\gamma_{\lambda,\phi}$ is defined by the equation:

$$\gamma_{\lambda,\phi} = \Sigma_{j=0}^{1} a_j / b_j \quad (25)$$

wherein the parameters a and b of the summation are, for example, indicated in the table of FIG. 19.

The second confidence value $\gamma_\Theta$ is calculated as a difference, in absolute module, between the current speed parameter $V_t$ and the speed received by the odometer 11 according to the formula:

$$\gamma_\Theta = |v_{GPS} - v_{odo}| \quad (26)$$

After having calculated the first confidence value $\gamma_\Theta$, if the comparison step verifies the second confidence value $\gamma_\Theta$ is greater than a lower threshold $$S_{\gamma_\theta}^{MIN} = 3\left[\frac{m}{s}\right]$$

quality calculation (200) provides to calculate the noise of the GNSS measurements (240) for defining, by suitable comparisons, the soundness of the received GNSS signals and their possible use. In an embodiment, the calculation of the noise of the GNSS measurements (240) is obtained by the GNSS unit 66 estimating the noise of GNSS measurements.

Figures 21, 22, 23:
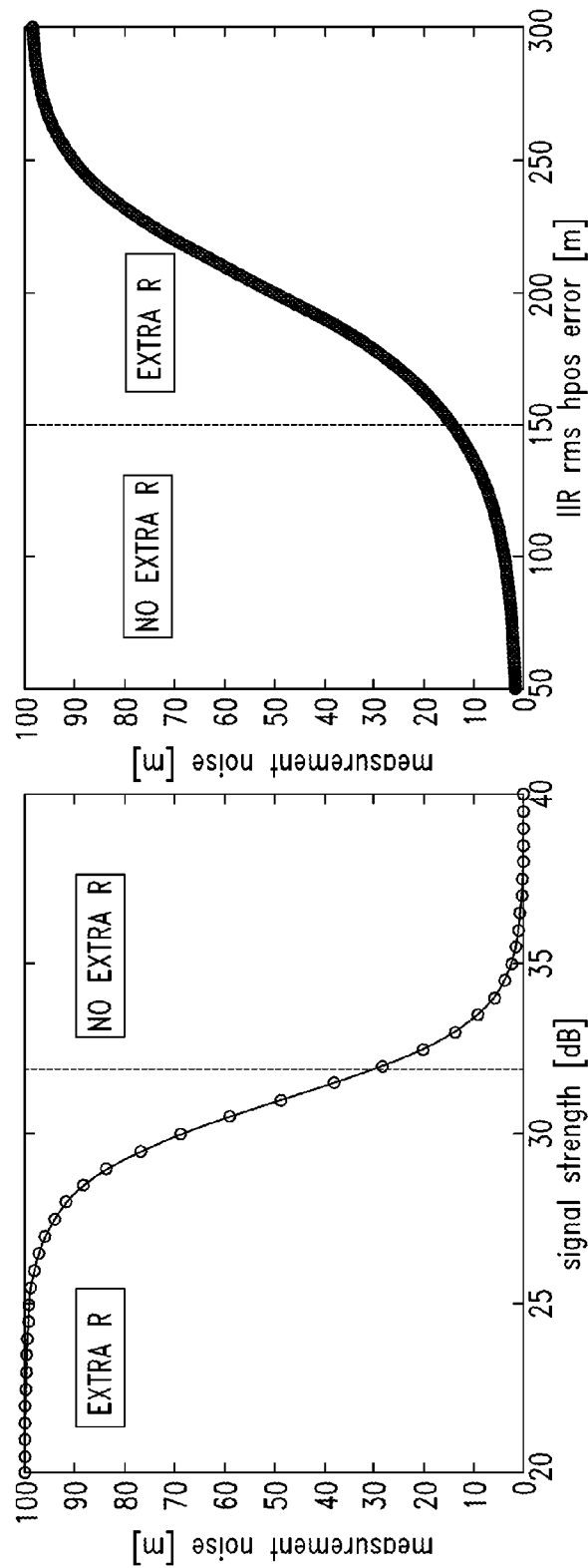

The calculation of the noise of the GNSS measurements (240) provides to compare the first confidence value $\gamma_{\lambda,\phi}$ of the satellites position with a lower threshold and a confidence upper threshold in order to define three belonging regions as shown in FIG. 20, according to the table of FIG. 21, wherein:

lower confidence, a region below a first level line A $$\gamma_{\lambda,\phi} < \Gamma_{\lambda,\phi}^{MIN}$$

the GNSS signals received by the satellites are rejected and are not used for calculating the altitude variation dh of vehicle 2;

upper confidence, a region above a second level line B:

$$\gamma_{\lambda,\phi} \geq \Gamma_{\lambda,\phi}^{MAX}$$

the GNSS signals heavily affect the calculation for determining the altitude variation dh of vehicle 2;

average confidence, a region comprised between the first A and second level lines B:

$$\Gamma_{\lambda,\phi}^{MIN} < \gamma_{\lambda,\phi} < \Gamma_{\lambda,\phi}^{MAX}$$

the GNSS signals received by the satellites are partially used for the altitude variation dh of vehicle 2.

In the table of FIG. 20, the upper confidence region is greater than the value $\Gamma_{\lambda,\phi}^{MAX} = 24$, and the lower confidence region is smaller than the value $\Gamma_{\lambda,\phi}^{MIN} = 17$.

Further, the calculation of the measurement noise GNSS (240) provides to define the latitude error $r_\lambda$, the longitude error $r_\Phi$ and the altitude error $r_\Theta$.

In an embodiment, the latitude error $r_\lambda$ is evaluated when the carrier-noise ratio cn0, in other words the strength of the received GNSS signal, is less than 32 dB, while the longitude error $r_\varphi$ is considered when the precision $\in_{\lambda,\varphi}$ of the estimated GNSS position, calculated by the function 22, is greater than 150 m.

According to an embodiment, the calculation of the noise of the GNSS measurements (240) provides to use the previously described following formulas 27-29:

$$r_\lambda = w_{\lambda,\varphi}\alpha^2(\sigma_{\lambda,\varphi} + \sigma_{cn0} + \sigma_{HPE} + \sigma_p^{RMS} \cdot HDOP)^2 \quad (27)$$

$$r_\varphi = w_{\lambda,\varphi}\beta^2(\sigma_{\lambda,\varphi} + \sigma_{cn0} + \sigma_{HPE} + \sigma_p^{RMS} \cdot HDOP)^2 \quad (28)$$

$$r_\theta = w_\theta(r_s + r_{\Delta\theta}) \quad (29)$$

The parameters: current Position $P_t$, current Speed $V_t$ and current Time t of vehicle 2 and also the latitude error $r_\lambda$, longitude error $r_\varphi$ and altitude error $r_\theta$ are used for calculating the altitude variation dh of vehicle 2.

Particularly, the calculation method (200) enables definition of, by the latitude error $r_\lambda$, longitude error $r_\varphi$ and altitude error $r_\theta$, the matrix R of the measurement noise which is suitably used in the above described update equations 8, 15 and 18, for obtaining the update values of the state variables in order to calculate the altitude variation dh of vehicle 2, by using the respective Kalman filters 41, 46 and 48 or other filters as previously described.

Further, the calculation method (200) defines the matrix Q, in other words the process noise matrix.

While, the parameters: current Position $P_t$, current Speed $V_t$ and current Time t are obtained by the calculation of the GNSS signals (160) and are used for defining the values to be introduced in the above identified equations suitable for calibrating the measurements received through the instruments or reference sensors: accelerometer 22, gyroscopes 21 and odometer 11.

The positioning apparatus, as shown and described, overcomes the drawbacks of the prior art, and enables accurate acquisition of the altitude h of a vehicle, in absolute terms, and reliably and positively the variations of altitude or level dh in the time interval Δt both in the absence of the satellite signal GSNN and in the presence of it. Particularly, the altitude estimated by the estimator-calibrator block is auto-offset from the thermal effects and is independent from errors introduced by the used instruments.

Further, the estimator-calibrator block of the positioning apparatus is efficient despite the use of economical inertial sensors. Indeed, it is well to observe that the measured data, are estimated and calibrated in order to improve the precision of the obtained altitude by mitigating possible errors caused by offset and sensitivity variations which the instruments can have as a function of the temperature and aging of the same.

Further, the estimator-calibrator block enables prediction and encoding of calibration values which in this way can be made available to the same inertial sensors by pre-programming or storing them in a datasheet, enabling so a faster and easier computation of the absolute altitude and of difference in level of the vehicle.

Moreover, the satellite navigation system and positioning apparatus can find an application in the automotive and telematics fields (toll roads, insurances and emergency calls), assistance with an automatic or autonomous piloting and for the vehicle-to-vehicle communications and also in the robotics field in order to define the position of a movable vehicle/platform also in case of weak or absent GNSS signal. Further application fields are in the navigation. The application fields are given in an exemplifying and non limiting way.

Experimental Results

The Applicant could implement the positioning apparatus by hardware and software for example by processing GNSS data.

The Applicant could implement a positioning apparatus and use it for some tests by using as hardware: STA8088, A3G4250D, AIS328DQ of the same Applicant and an analog odometer and by using a A3G4250D model 6-axes IMU sensor for the gyroscope 21 and AIS328DQ model for the accelerometer 22 tested by a software simulation system.

Figure 27:
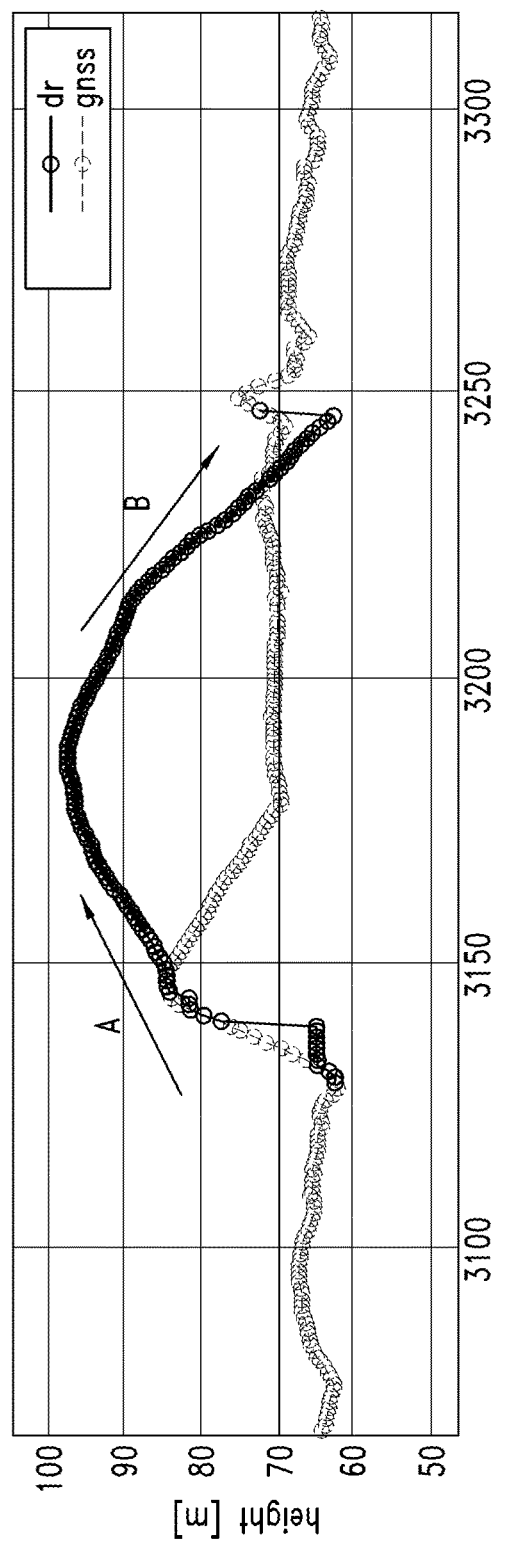
FIGS. 27, 28 and 29 show corresponding diagrams for detecting a vehicle position obtained by the same Applicant by means of a satellite navigation system according to the present disclosure.
Figure 28:
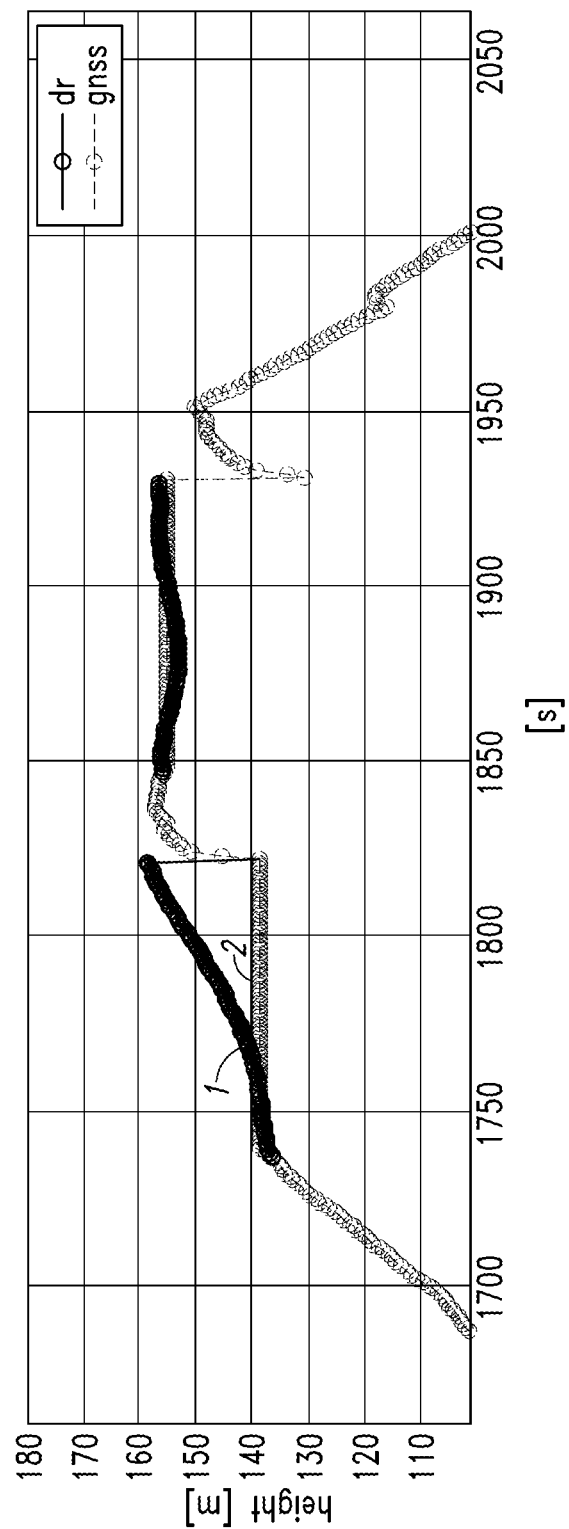
Figure 29:
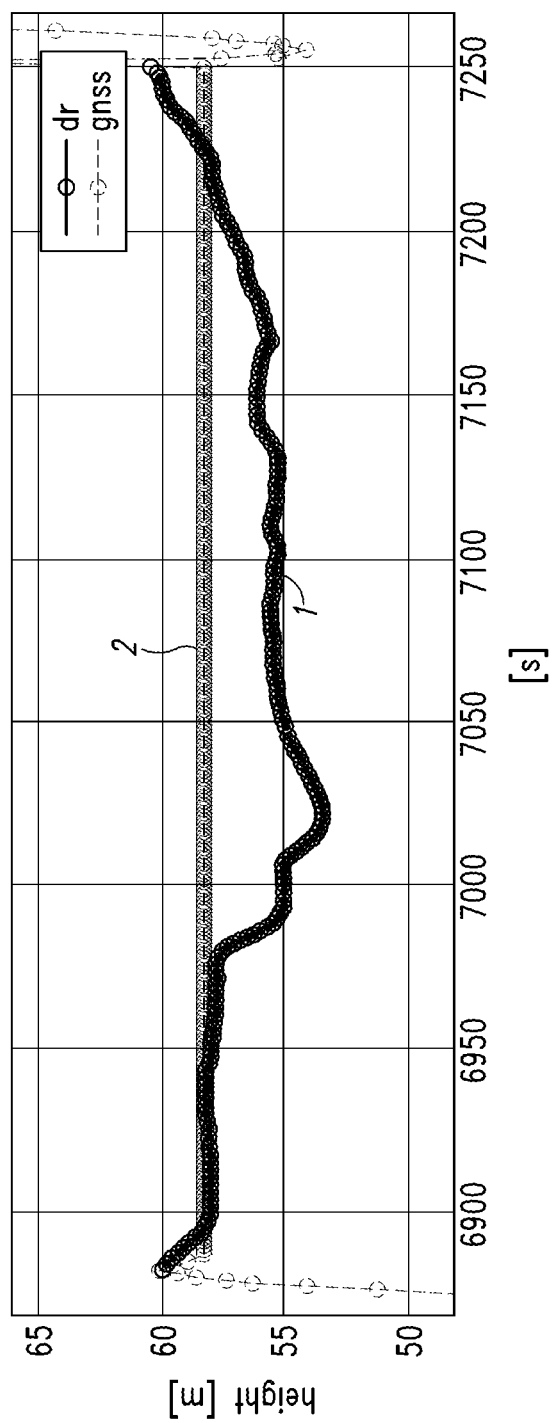

The soundness of what has been described can be evaluated by considering the results of the estimated altitude by the present positioning apparatus by using only the inertial sensors shown in FIGS. 27-29, wherein the line 1, indicates the results without the contribution of the GNSS signals, and the line 2, the results obtained by the contribution of the GNSS signals. The path, of the chart in FIG. 27, shows a spiral initial ramp with three loops upwardly, and towards the final point, a ramp with three loops downwardly and it is possible to detect that the line 2 has a length wherein the altitude stays constant showing a disturbed reception of the GNSS signal, while the line 1 correctly detects the altitude variation.

Instead, FIG. 28 illustrates the simulation data of a second example wherein the same hardware and software instruments of the example shown in FIG. 27 are used.

The path has a tunnel on a road having a slope variation. It is evident that the line 1 identifies the slope variation also of the first length with the tunnel, while it is not shown in the line 2, further in the central segment the lines 1 and 2 overlap.

Instead, FIG. 29 illustrates the simulation data of a third example wherein the same hardware and software instruments of the example shown in FIG. 27 are used.

The path, extends on an underground parking with a change of level wherein the GNSS signals are not available as shown by the line 2 in FIG. 29, while the line 1 identifies the change of level detected by the inertial sensors.

The proposed technique overcomes the drawbacks of the prior art and to obtain, by an accurate and efficient estimation, the 3-D position of the vehicle by obtaining the altitude only by the inertial sensors without affecting the computational complexity of the calculation algorithm.

Particularly, the positioning apparatus enables detection of the vehicle position independently from the satellite GNSS signals reception.

LEGEND OF THE FIGURES

Figure 2:
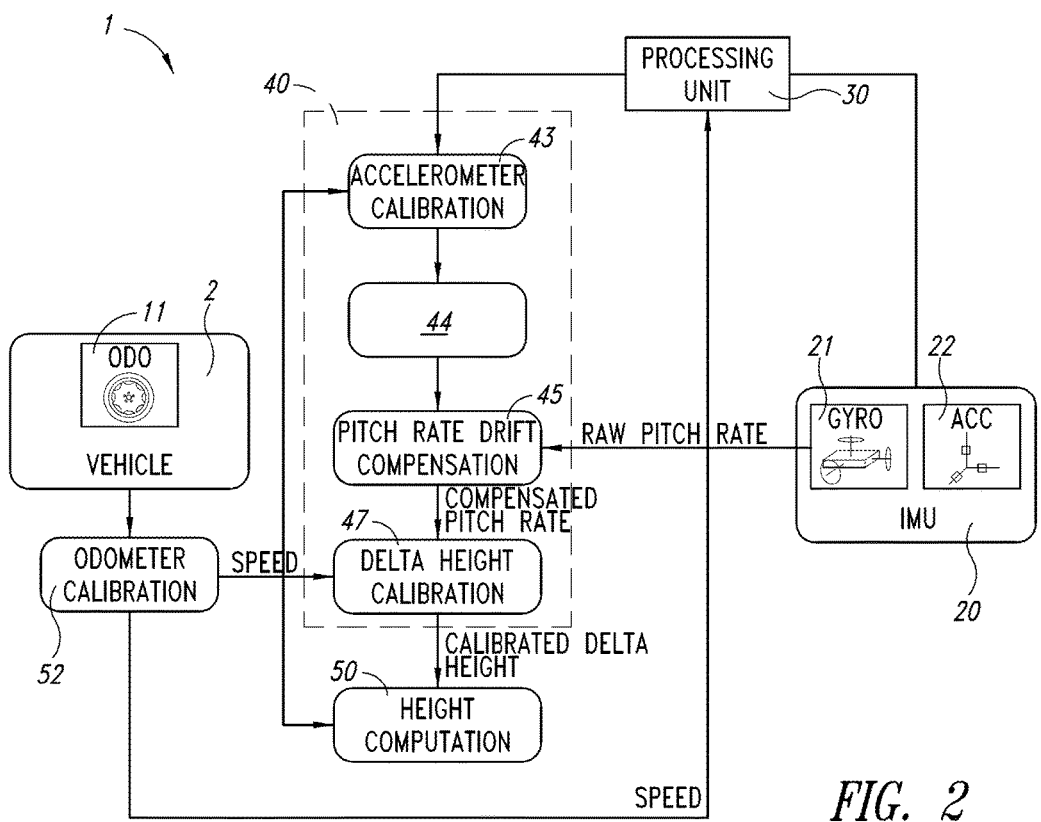
FIG. 2 shows a flow chart of the positioning apparatus in FIG. 1.
Figure 11:
FIG. 11 shows a further processing module used for obtaining the position of a vehicle.

FIG. 1:
(20) IMU: Inertial Measuring Unit
(21) Gyro: Gyroscope
(22) Acc: Accelerometer
Raw angular Rates & Accelerations
(2) VEHICLE: Vehicle
(11) ODO: Odometer
Raw traveled path: Path Measured
(15) HOST PROCESSOR: Processor/Receiver
Acceleration: Acceleration
Sensor aided position, heading: Assisted Position Sensor, Vertical Direction
Sensor aided height, pitch: Assisted Altitude Sensor, Pitch
Measurements: Measures
FIG. 2
(2) VEHICLE: Vehicle
(11) ODO: Odometer
(52) Odometer calibration: Odometer Calibration Speed: Speed
(43) Accelerometer Calibration: Accelerometer Calibration
(45) Pitch Rate Drift Compensation: Pitch Shift Compensation
Raw Pitch rate: Value of Raw Pitch
Compensated pitch rate: Pitch Offset Value
(47) Delta Height Calibration: Calibration of Altitude Variation
Calibrated Delta Height: Variation of Calibrated Altitude
(50) Height Computation: Altitude Calculation
(30) Processing Unit: Processing Unit
(20) IMU: Inertial Measuring Unit
(21) Gyro: Gyroscope
(22) Acc: Accelerometer
FIG. 5
Vertical Accel Calibration: Calibration of Vertical Acceleration
Cross track accel Calibration: Calibration of Centripetal Acceleration
Along track accel Calibration: Calibration of Tangential Acceleration
FIGS. 6-7
Prediction: Prediction
Update: Updating
FIG. 9a
(45) Pitch Rate Drift Compensation: Pitch Shift Compensation
FIG. 10a
(47) Delta Height Sensitivity Calibration: Calibration of the Height Change
FIG. 11
(50) Height Estimation: Estimation of Height
FIG. 12
Xtrack acc: Acceleration of the X Track
Probability: Probability
Gain: Gain
Offset: Compensation
FIG. 13:
(20) IMU: Inertial Measuring Unit
(21) Gyro: Gyroscope
(22) Acc: Accelerometer
Raw angular rates&accelerations: Angular Rate & Acceleration
(2) VEHICLE: Vehicle
(11) ODO: Odometer
Raw traveled path: Measured path
(3) RECEIVER: Receiver
GNSS: Global Navigation Satellite System
(15) HOST PROCESSOR: Processor/Receiver
Position, speed and heading: Position, Velocity, and Direction
Height and vertical velocity: Altitude and Vertical Velocity
Acceleration: Acceleration
Sensor aided position, heading: Assisted Position Sensor, Vertical Direction
Sensor aided height, pitch: Assisted Altitude Sensor, Pitch
Measurements: Measures
FIG. 14
(2) VEHICLE: Vehicle
(11) ODO: Odometer
(52) Odometer calibration: Odometer Calibration
Speed: Speed
(43) Accelerometer Calibration: Accelerometer Calibration
(45) Pitch Rate Drift Compensation: Pitch Shift Compensation
Raw Pitch rate: Value of Raw Pitch
Compensated pitch rate: Pitch Offset Value
(47) Delta Height Calibration: Calibration of Altitude Variation
Calibrated Delta Height: Variation of Calibrated Altitude
(50) Height Computation: Altitude Calculation
Vertical speed: Vertical Speed
Height: Altitude
(30) Processing Unit: Processing Unit
(51) Yaw Rate Calibration: Yaw Rate Calibration
(20) IMU: Inertial Measuring Unit
(21) Gyro: Gyroscope
(22) Acc: Accelerometer
(3) RECEIVER: RICEVITORE
GNSS: Global Navigation Satellite System
FIG. 15
GNSS Position Velocity And Time: GNSS Position, Velocity, and Time
GNSS Accepted/rejected: GNSS Accepted/Rejected
GNSS Measurement Noise: GNSS Noise Measurement
(61) GNSS PVT Calculation: GNSS PVT (Position, Velocity, Time) Calculation
(3) GNSS Receiver: GNSS Receiver
FIG. 16
(150) Receiving GNSS signals: Receiving GNSS Signals
(160) Calcilation GNSS PVT signals: Calculating GNSS PVT (Position, Velocity, Time)
Signals
Position $P_t$: Position $P_t$
Speed $V_t$: Velocity $V_t$
Time $t_t$: Time $t_t$
(210) GNSS Accepted/Rejected: GNSS Accepted/Rejected
(220) Signal Metrics Calculation: Calculation of the Signal Metrics
(230) Confidence calculation: Confidence Calculation
(position confidence): (Confidence of the Position)
(velocity confidence): (Confidence of the Velocity)
(240) GNSS Measurement noise calculation: Calculation of GNSS Measurement Noise
(Latitude Measurement Noise): (Latitude Measurement Noise)
(Longitude Measurement Noise): (Longitude Measurement Noise)
(Heading Measurement Noise): (Altitude Measurement Noise)
FIG. 17
FIX IS 3-D?: 3D (Three Dimensional) fixed
Signal strength: Signal Power
STOPPED?: Interrupted?
REJECT FIX: Rejected
ACCEPT FIX: Accepted
FIG. 19
PARAMETER: Parameter
WEIGHT: Weight
Pseudorange residuals RMS: Residual Pseudorange RMS
HDOP: Horizontal Dilution of the Prediction
FIG. 20
Confidence: Confidence
Pseudorange residual rms: Residual Pseudorange RMS
FIG. 21
High confidence: High Confidence
Average confidence: Average Confidence
Low confidence: Low Confidence
FIG. 22
Measurement noise: Measurement Noise
signal strength: Signal Power
FIG. 23
measurement noise: Measurement Noise
IIR rms hpos error: RMS Error HPOS IIR FIG. 24
Position confidence level: Position Confidence Level
High: High
Average: Medium
Low: Low
FIG. 25
Position confidence level: Position Confidence Level
High: High
Average: Medium
Low: Low
FIG. 26
Measurement noise: Measurement Noise
speed: Speed
GOOD POS CONF: Conferring Good Position
AVG POS CONF: Conferimento di posizione media Conferring Average Position
BAD POS CONF: Conferring Bad Position
FIGS. 27-28-29
Height: Altitude A means, or module, as used herein may include a hardware module, such as one or more electronic circuits; a software module, such as one or more processor-executable instructions or one or more representations of processor-executable instructions; or a combined hardware and software module.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle positioning apparatus, comprising:
a measuring module associable to a vehicle, the measuring module having a triaxial orientation sensor and a triaxial movement sensor, the triaxial orientation sensor configured to provide measured axial accelerations in a Cartesian reference system during a time interval between a previous time and a current time, the triaxial movement sensor configured to supply a first angular variation signal proportional to an axial angular speed of the vehicle during said time interval;
a processing unit configured to:
receive a distance signal proportional to a distance traveled by said vehicle in said time interval;
receive said first angular variation signal; and
supply at least one reference acceleration of said vehicle;
an estimator-calibrator block configured to recursively estimate at least one calibrated acceleration as a function of said measured axial acceleration and of said at least one reference acceleration, wherein said estimator-calibrator block includes a calculation unit configured to calculate an altitude variation as a function of said distance signal and an estimated pitch angle, the estimated pitch angle recursively calculated as a function of at least one calibrated acceleration, wherein said altitude variation is arranged to correct a current position of the vehicle, said current position determined based on a plurality of satellite signals from at least two satellites of a navigation satellite system.

2. The apparatus according to claim 1, wherein said estimator-calibrator block comprises:
a first calibrator configured to recursively and separately calculate a first calibrated acceleration, a second calibrated acceleration, a third calibrated acceleration, and respective calibration parameters of said orientation sensor by using a discrete recursive mathematical model which includes prediction equations and update equations calculated as a function of a first measured axial acceleration, a second measured axial acceleration, a third measured axial acceleration, a first reference acceleration, a second reference acceleration, a third reference acceleration, and estimated error values.

3. The apparatus according to claim 2, wherein said estimator-calibrator block comprises:
a compensation unit, the compensation unit configured to calculate from a second angular variation signal an input pitch angle, the compensation unit further configured to determine, by a discrete recursive mathematical model, an offset pitch angle of the vehicle and a calibration parameter of said movement sensor as a function of said estimated pitch angle obtained by said calculation unit at the current time and of said input pitch angle.

4. The apparatus according to claim 3, wherein said estimator-calibrator block comprises:
a second calibrator configured to receive a measured vertical speed of said vehicle, said offset pitch angle, and said distance signal, said second calibrator configured to calculate by a discrete recursive mathematical model a gain estimated factor and a calibrated altitude variation.

5. The apparatus according to claim 4, further comprising:
a calculation module, the calculation module configured to recursively calculate an estimated altitude value at the current time as a function of said calibrated altitude variation, the calculation module configured to calculate an estimated altitude value at the previous time.

6. The apparatus according to claim 1, wherein the first calibrator, the compensation unit, and the second calibrator are each configured to apply a discrete recursive mathematical model that includes at least one of a Kalman filter, an alpha filter, and a least squares algorithm.

7. The apparatus according to claim 1, wherein said orientation sensor is a micro-electro-mechanical system (MEMS) based accelerometer and said movement sensor is a MEMS-based gyroscope.

8. The apparatus according to claim 1, comprising:
a compensation module configured to calculate offset angles for each axis of the measuring module to align axes X, Y, and Z of the Cartesian reference system of said measuring module with axes of a frame of the vehicle, wherein the measuring module includes a pressure sensor configured to measure an estimated altitude value of said vehicle at the previous time.

9. A navigation device, comprising:
a satellite receiver configured to extract output signals from a plurality of satellite signals supplied by a satellites constellation of a global navigation satellite system;
a positioning apparatus having:
a triaxial orientation sensor and a triaxial movement sensor, the triaxial orientation sensor configured to provide measured axial accelerations in a Cartesian reference system during a time interval between a previous time and a current time, the triaxial movement sensor configured to supply a first angular variation signal proportional to an axial angular speed of the navigation sensor during said time interval; and a processing block having a calculation module and a quality evaluation module, the calculation module configured to obtain current position, speed, and time information of said navigation device, and the quality evaluation module configured to obtain error parameters of said output signals.

10. The navigation device according to claim 9, wherein said processing block is configured to receive a distance signal proportional to a distance traveled by said navigation device in said time interval.

11. The navigation device according to claim 9, wherein said estimator-calibrator comprises:

a compensation unit configured to calculate an input pitch angle and a calibration parameter of said triaxial movement sensor as a function of said estimated pitch angle and of said input pitch angle.

12. The navigation device according to claim 9, wherein said estimator-calibrator block comprises:

a calibration module configured to generate calibration parameters of said triaxial orientation sensor.

13. The navigation device according to claim 9, wherein said estimator-calibrator block comprises:

a calibration module configured to calculate a calibrated altitude variation.

14. The navigation device according to claim 9, wherein said estimator-calibrator block comprises:

a calculation module configured to calculate an estimated altitude value at the current time and an estimated altitude value at the previous time.

15. A hybrid navigation method integrating satellite-based signals with local motion detector signals in a navigation computing device, comprising:

performing a local calibration routine, the local calibration routine configured to modify axial acceleration values generated by a triaxial orientation sensor;

receiving a plurality of calibrated axial acceleration values generated by the triaxial orientation sensor;

receiving a plurality of angular variation signals proportional to an axial angular speed of a vehicle;

generating three-dimensional position data based on said plurality of calibrated axial acceleration values and said angular variation signals;

receiving a plurality of satellite signals from at least two satellites of a navigation satellite system;

analyzing said plurality of satellite signals to obtain parameters associated with a vehicle, said parameters including a current position, a current speed, and a current time;

calculating noise component values associated with the plurality of satellite signals, wherein calculating said noise component values includes defining a latitude error, defining a longitude error, and defining an altitude error; and generating updated parameters associated with the vehicle from a calculation that combines said three-dimensional position data with said parameters associated with the vehicle, wherein said calculated noise component values are applied to at least a portion of said three-dimensional position data.

16. The hybrid navigation method according to claim 15, comprising:

calculating an altitude variation of said vehicle based on said current position, said current speed, said current time, said latitude error, said longitude error, and said altitude error.

17. The hybrid navigation method according to claim 15, wherein calculating noise component values associated with the plurality of satellite signals comprises:

performing a confidence calculation on said parameters associated with the vehicle, wherein said confidence calculation includes determining a first confidence value as a function of said at least two satellites' position and determining a second confidence value as a function of said vehicle's speed;

comparing said second confidence value with a confidence threshold value;

when said second confidence value exceeds said confidence threshold value:

providing a lower confidence threshold;

providing an upper confidence threshold;

based on said upper and lower confidence thresholds, determining a reject region of said plurality of satellite signals, an intermediate region of said plurality of satellite signals, and an acceptance region of said plurality of satellite signals;

comparing said first confidence value with at least one of said reject region, said intermediate region, and said acceptance region;

based on comparing said first confidence value, defining a belonging region of said first confidence value, wherein said latitude, longitude, and altitude errors are defined based on said belonging region of said first confidence value.

18. The hybrid navigation method according to claim 15, comprising:

performing a signal metrics calculation, wherein performing said signal metrics calculation includes filtering said parameters associated with the vehicle to define at least one estimated precision of a satellite position, a precision error of estimated satellite speed, and a carrier-noise ratio; and evaluating, based on said signal metrics calculation, if said parameters associated with the vehicle are reliable.

19. The hybrid navigation method according to claim 15, comprising:

comparing each of said plurality of satellite signals with at least one parameter threshold value; and rejecting ones of said plurality of satellite signals that do not meet said threshold value.

20. The hybrid navigation method according to claim 15, wherein performing the local calibration routine comprises:

performing a calibration function to generate correction factors associated with the triaxial orientation sensor;

recursively estimating at least one calibrated acceleration as a function of axial acceleration;

recursively calculating an estimated pitch angle as a function of said at least one calibrated acceleration; and calculating an altitude variation as a function of a distance signal and said estimated pitch angle.

* * * * *